United States Patent
Buelow, II et al.

(10) Patent No.: US 7,588,342 B2
(45) Date of Patent: Sep. 15, 2009

(54) LIGHTED REFRIGERATED DISPLAY CASE WITH REMOTE LIGHT SOURCE

(75) Inventors: Roger F. Buelow, II, Gates Mills, OH (US); John M. Davenport, Middleburg Heights, OH (US); William J. Cassarly, Wooster, OH (US); Thomas L. R. Davenport, Tucson, AZ (US); Gregory P. Frankiewicz, Mayfield Heights, OH (US); Chris H. Jenson, Twinsburg, OH (US); Robert H. Caywood, Vermillon, OH (US)

(73) Assignees: Energy Focus, Inc., Solon, OH (US); Optical Research Associates, Pasadena, CA (US)

( * ) Notice: Subject to any disclaimer, the term of this patent is extended or adjusted under 35 U.S.C. 154(b) by 0 days.

(21) Appl. No.: 11/379,997

(22) Filed: Apr. 24, 2006

(65) Prior Publication Data
US 2007/0247831 A1    Oct. 25, 2007

(51) Int. Cl.
A47F 11/10    (2006.01)
(52) U.S. Cl. .................. 362/125; 362/126; 362/154; 362/133
(58) Field of Classification Search ............... 362/154, 362/133, 125–126, 92, 576; 312/223.5; 62/264; 385/146
See application file for complete search history.

(56) References Cited

U.S. PATENT DOCUMENTS 4,394,714 A * 7/1983 Rote ..................... 362/576
4,539,625 A * 9/1985 Bornstein et al. ........ 362/576
4,567,891 A   2/1986 Kanshin et al.

(Continued)

FOREIGN PATENT DOCUMENTS

JP    HEI 06-118238    4/1994

(Continued)

OTHER PUBLICATIONS

3 Pages entitled "Accessory Fittings" from www.luciferlighting.com/fo_affiberstrip.htm webpage (viewed on Apr. 11, 2006) showing "FSL-20 Fiber Strip Light"—admitted as prior art.

(Continued)

*Primary Examiner*—Jong-Suk (James) Lee
*Assistant Examiner*—Robert May
(74) *Attorney, Agent, or Firm*—Charles E. Bruzga

(57) ABSTRACT

Lighted refrigerated display case with remote light source comprises a closed container with an interior of the container refrigerated to a temperature below 7 C. The container is thermally insulated from ambient, having internal and external walls. A solid fiber optic luminaire is at least partially mounted within the container, having an elongated side-light emitting portion for emitting light from the side of the luminaire onto contents in an interior of the display case. The side-light emitting portion comprises an extractor of light arranged to preferentially extract light from the luminaire and direct the light in at least one radial direction along the length of the side-light emitting portion to at least one target area of said contents along a longitudinal axis of the side-light emitting portion. A light-delivery system provides light to the fiber optic luminaire, having a light source mounted remotely from the interior of the container.

4 Claims, 24 Drawing Sheets

U.S. PATENT DOCUMENTS

| | | | |
|---|---|---|---|
| 4,918,579 A * | 4/1990 | Bennett | 362/559 |
| 5,222,795 A * | 6/1993 | Hed | 362/558 |
| RE34,318 E * | 7/1993 | Davenport et al. | 362/511 |
| 5,471,372 A | 11/1995 | Mamelson et al. | |
| 5,594,826 A * | 1/1997 | Wood et al. | 385/88 |
| 5,836,669 A * | 11/1998 | Hed | 362/92 |
| 5,857,761 A | 1/1999 | Abe et al. | |
| 5,903,695 A | 5/1999 | Zarian et al. | |
| 5,987,199 A | 11/1999 | Zarian et al. | |
| 6,059,420 A | 5/2000 | Rogers | |
| 6,095,673 A | 8/2000 | Goto et al. | |
| 6,219,480 B1 | 4/2001 | Cassarly et al. | |
| 6,278,827 B1 | 8/2001 | Sugiyama et al. | |
| 6,282,355 B1 | 8/2001 | Zarian et al. | |
| 6,289,150 B1 | 9/2001 | Zarian et al. | |
| 6,304,693 B1 | 10/2001 | Buelow, II et al. | |
| 6,478,445 B1 | 11/2002 | Lange et al. | |
| 6,726,341 B2 | 4/2004 | Pashley et al. | |
| 6,783,269 B2 | 8/2004 | Pashley et al. | |
| 6,860,628 B2 | 3/2005 | Robertson et al. | |
| 7,062,129 B2 | 6/2006 | Archer | |
| 2002/0028042 A1 | 3/2002 | Zarian et al. | |
| 2002/0109980 A1 | 8/2002 | Santosuosso et al. | |
| 2004/0047154 A1* | 3/2004 | Miller et al. | 362/285 |
| 2004/0141336 A1* | 7/2004 | West et al. | 362/555 |
| 2005/0259931 A1* | 11/2005 | Gaydoul et al. | 385/116 |
| 2006/0138916 A1 | 6/2006 | Kordon | |
| 2006/0245205 A1* | 11/2006 | Hughes et al. | 362/576 |

FOREIGN PATENT DOCUMENTS

| | | |
|---|---|---|
| JP | HEI 07-198950 | 8/1995 |
| JP | HEI 07-201218 | 8/1995 |

OTHER PUBLICATIONS

1 Page entitled "Fiber Optic Lighting" from www.zero-zone.com/page.asp? page_id=59 webpage (viewed on Jul. 20, 2006) showing fiberoptic lighting in a freezer case—admitted as prior art.

* cited by examiner

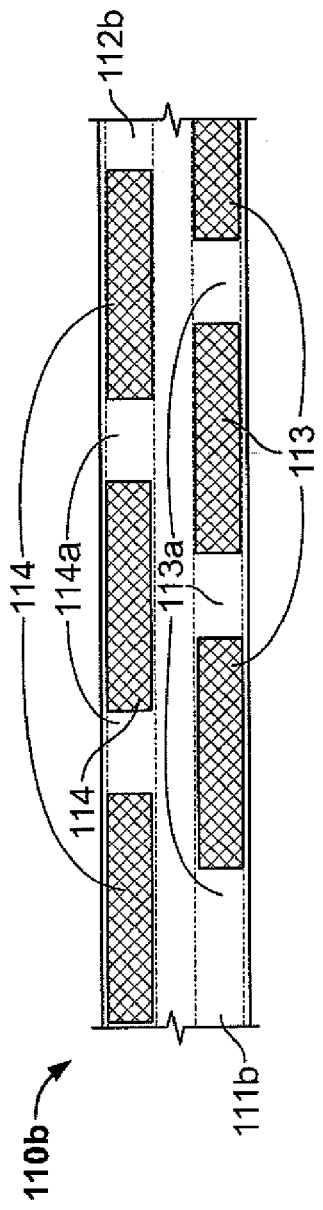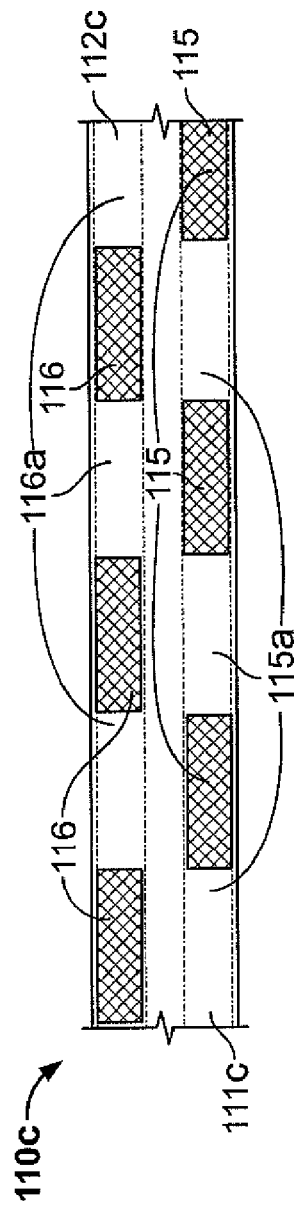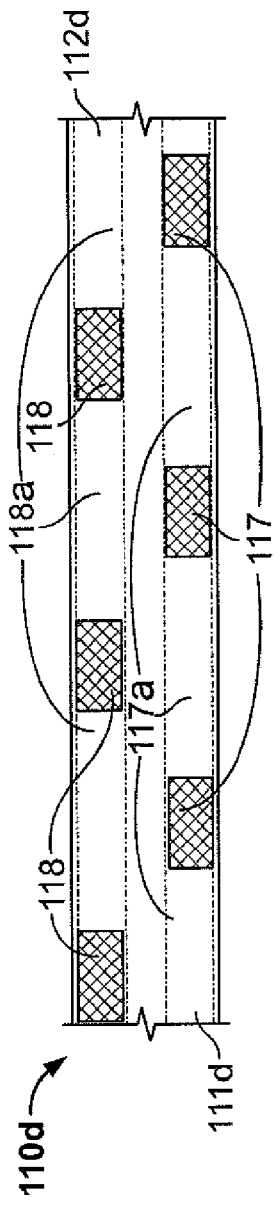

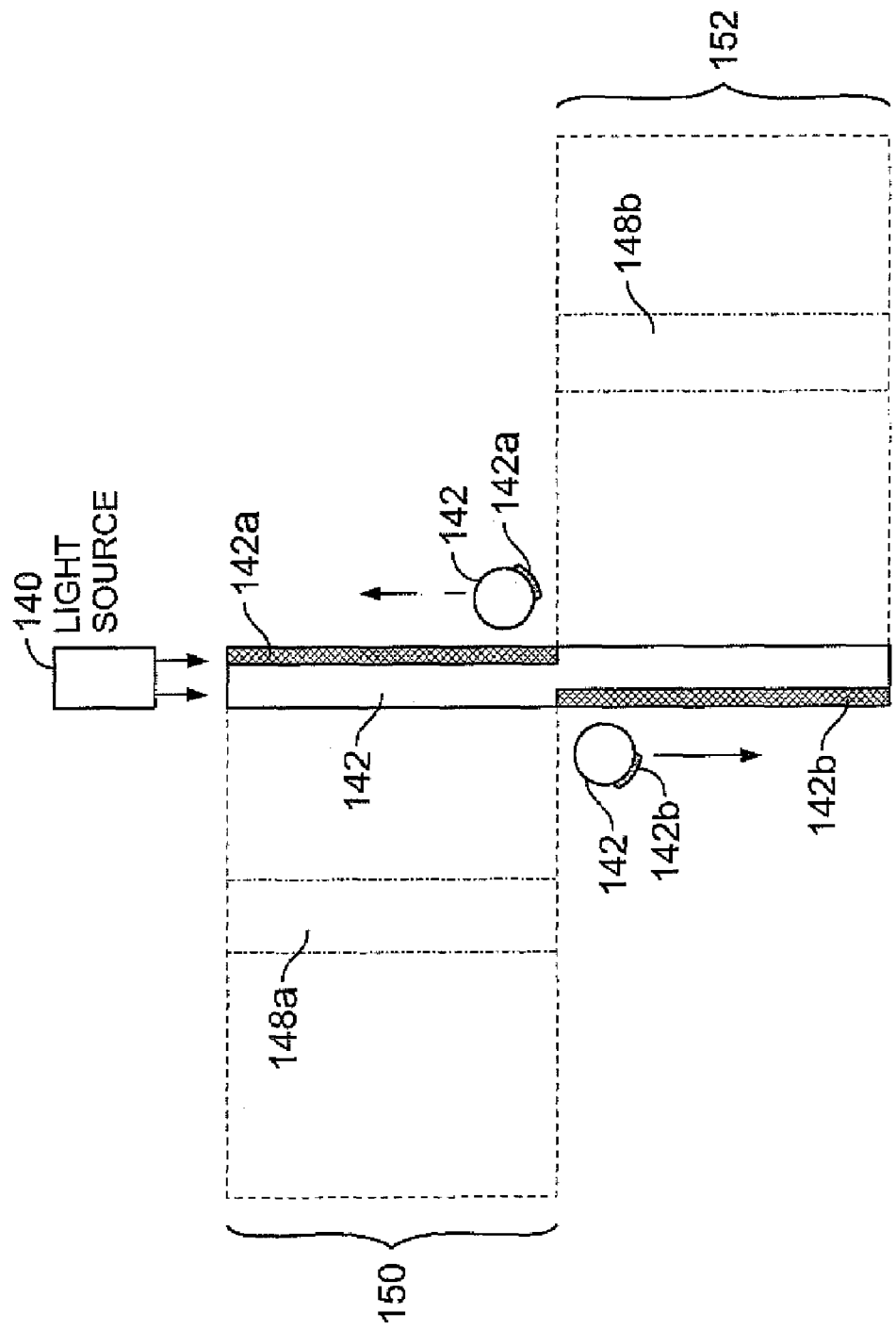

LIGHTED REFRIGERATED DISPLAY CASE WITH REMOTE LIGHT SOURCE

CROSS-REFERENCE TO RELATED APPLICATION

This application is related to co-pending application Ser. No. 11/379,999 filed Apr. 24, 2006, entitled "Lighted Display Case with Remote Light Source." The foregoing application has the same inventors, and is assigned to the same assignees as the present application.

FIELD OF THE INVENTION

The present invention relates to a lighted refrigerated display case with a remote light source. More particularly, the invention relates to such a display case in which light for illuminating contents of the case is provided by a fiber optic luminaire.

BACKGROUND OF THE INVENTION

Traditional refrigerated display cases used in grocery stores for displaying food products employ fluorescent lamps for internal illumination. Refrigerated cases may be cold cooled to below about 7 C for non-frozen foods, and below about −7 C for frozen foods. Refrigerated cases typically include doors with view ports for viewing food products in the cases. Fluorescent lamps typically may illuminate food products in the internal of the cases with an acceptable level of illumination. Fluorescent lamps in elongated, tube form are typically used. This is because traditionally there has been no other light source available that would produce enough light over a large enough area so as to illuminate the food products over the entire dimension of a view port of a door.

However, using fluorescent tubes in the lowered temperatures mentioned above poses several problems. First, the fluorescent tubes suffer from significant decreases in luminous efficiency (50% or more) at typical lowered temperatures within refrigerated cases. In some situations, special means must be provided to enable fluorescent tubes to even operate, such as driving them with additional power to warm them up in the refrigerated case. Sometimes, the fluorescent tube is sealed partially or completely in a thermal compartment to help trap heat from the tube to prevent the tube from getting too cold.

Despite the foregoing efforts to mitigate significant difficulties in operating fluorescent tubes in refrigerated cases, serious problems still remain. The thermal compartments (or covers) housing the tubes are often dislodged, broken or lost during maintenance, with the result that the light output drops significantly. Even when the covers are properly maintained, the tubes do not operate at the optimal temperatures required for efficient operation. When a lamp fails, a specialist must be called in to replace the lamp if the thermal compartments or covers are to be properly maintained. This process is expensive and time-consuming and can result in a significant period of time during which a section of a refrigerated display case and its product contents remain unlighted. Another reason a specialist is needed is due to the proximity of the food to the fluorescent tube, which is made of fragile glass and would release hazardous materials if broken during lamp replacement. Such an event would require discarding all food products contaminated by the broken lamp.

Another common problem with fluorescent lamps is failure of lamp ballasts. The ballasts are usually located within a door frame, and for this reason the door would be removed from the frame to replace the failed ballast. This is another costly operation which must be performed by a specialist to ensure the proper reinstallation and operation of the door.

Yet another significant problem with fluorescent lamps in refrigerated display cases is that the heat generated by the lamps work counter to the compressor systems which attempt to keep the food contents cold. The thermodynamic principles of refrigeration dictate that it takes approximately 3 Watts of continuous power to remove 1 Watt of ongoing heating introduced into the cooled internal of a refrigerated display case. Thus, the overall electrical load of the fluorescent lighting system is multiplied approximately threefold when operating inside a refrigerated display case.

Accordingly, it would be desirable to provide a light source for illuminating the contents of a refrigerated display case which is easy to maintain, which does not require a specialist, and which does not deliver excess heat into the cooled internal of the display case.

BRIEF SUMMARY OF THE INVENTION

The disclosed invention provides these benefits and others such as requiring less electrical power to provide comparable amounts of light even apart from the energy savings obtained by keeping the heat out of the freezer or refrigerator.

In accordance with one form of invention, a lighted refrigerated display case with remote light source is presented which comprises a closed container, an interior of the container being refrigerated to a temperature below 7 C. The container is thermally insulated from an ambient, and has internal and external walls. A solid fiber optic luminaire is at least partially mounted within the container. The luminaire has an elongated side-light emitting portion for emitting light from the side of the luminaire onto contents in an interior of the display case. The side-light emitting portion comprises an extractor of light arranged to preferentially extract light from the luminaire and direct the light in at least one radial direction along the length of the side-light emitting portion to at least one target area of said contents along a longitudinal axis of the side-light emitting portion. A light-delivery system provides light to the fiber optic luminaire, and has a light source mounted remotely from the interior of the container.

The foregoing refrigerated display case uses an efficient remote light source for illuminating contents of the case. It requires only about half or less of the power of a typical fluorescent system to light a typical refrigerated display case. Because the illuminator is remotely located, the heat from the lamp and ballast is not introduced into the cold environment of the refrigerated display case, thereby reducing the cooling load and attendant cooling costs. Additionally, the remotely located ballast and light source permits easy servicing without the need to employ a specialist or risk contaminating the product with hazardous materials.

BRIEF DESCRIPTION OF THE DRAWINGS

In the drawings, like reference numerals refer to like parts.

FIGS. 14E-14G are side views of luminaires.

FIGS. 15A-15B are simplified views of view ports of the display case of FIG. 1 and associated luminaires.

DETAILED DESCRIPTION OF THE INVENTION

Figure 1:
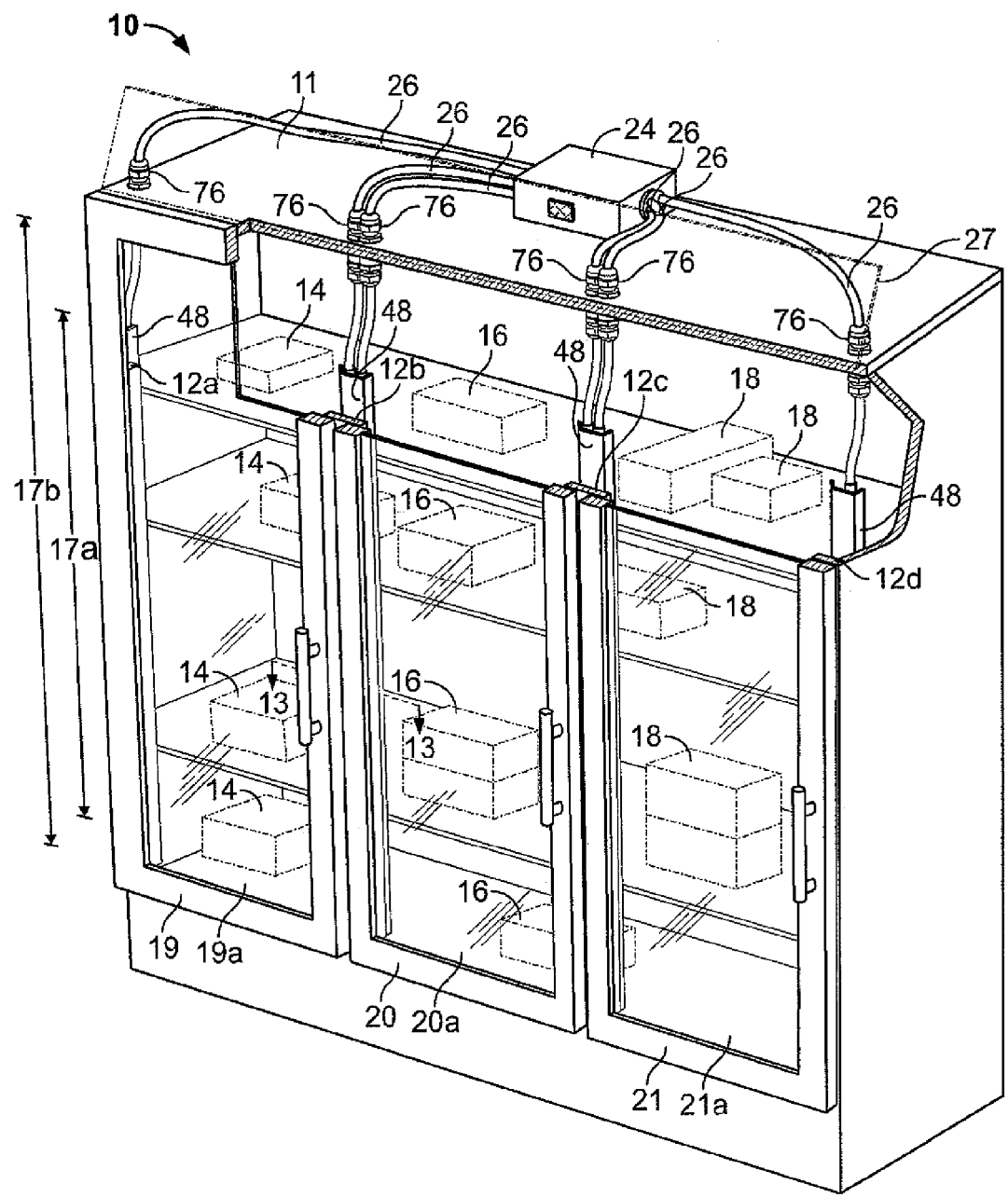
FIG. 1 is a perspective view of a lighted display case, shown partially cutaway.
Figure 3:
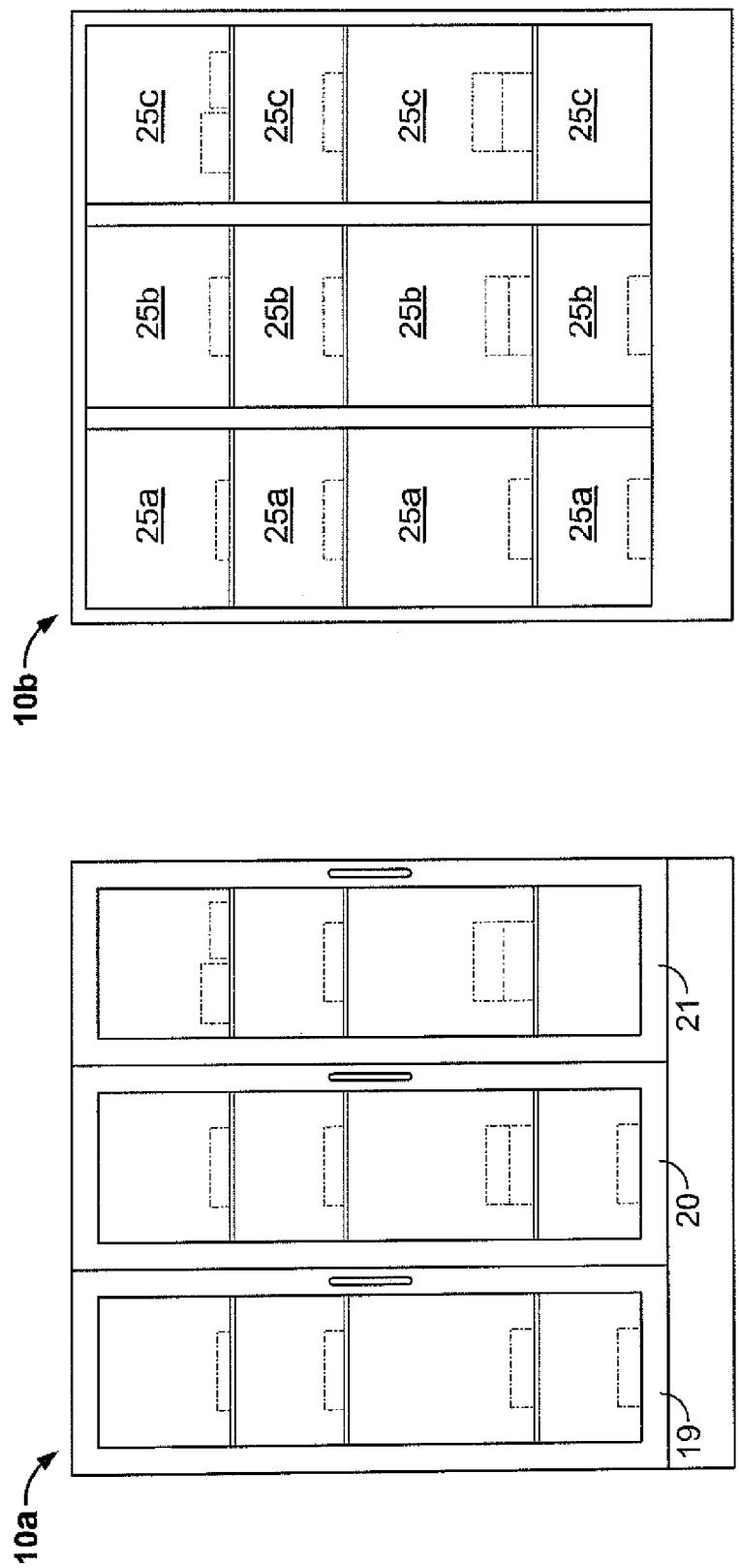
FIGS. 2 and 3 are simplified front views of the display case of FIG. 1 in reduced size.
Figure 2:

FIG. 1 shows a display case 10 for illuminating contents of the case, such as contents 14, 16 and 18. Case 10 includes a closed container 11 and fiber optic luminaires (not shown) behind structural members 12a-12d for achieving the foregoing purpose of illumination. The term "fiber optic" luminaire is intended to cover an acrylic rod luminaire that receives light directly from a light source as well as indirectly through a fiber optic cable or other structure. Preferably, case 10 includes doors 19, 20 and 21 having respective view ports 19a, 20a and 21a. These view ports preferably comprises transparent windows, as shown, but could comprise a doorway when doors 19, 20 or 21 are opened for viewing contents of the display case. The luminaires extend vertically over dimension 17a, whereas the maximum dimension of a view port (e.g., 19a) is dimension 17b. As can be seen dimension 17a is at least the majority of dimension 17b. Rather than including windows 19a, 20a and 21a on doors, display case 10a of FIG. 2 shows doors 19, 20 and 21 lacking windows; and FIG. 3 shows display case 10b lacking doors and instead having openings 25a, 25b and 25c allowing access to contents. As shown in FIG. 1, an illuminator 24 is preferably mounted atop container 11, with flexible fiber optic cables 26 leading to the luminaires (not shown). A facade 27, shown in phantom, may shield illuminator 24 and fiber optic cables 26 from view.

Figure 4:
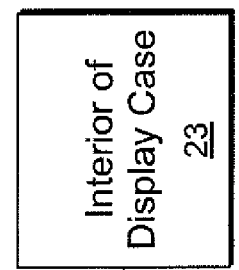
FIG. 4 is a block diagram of refrigeration means for the interior of the display case of FIG. 1.

Referring to FIG. 4, interior 23 of display case 10 (FIG. 1) is preferably refrigerated to below about 7 C for unfrozen refrigeration of contents, and below about −7 C for frozen refrigeration of contents. This may be accomplished by conventional refrigeration means 22 for cooling interior 23 of display case 10 of FIG. 1.

Figure 5A:
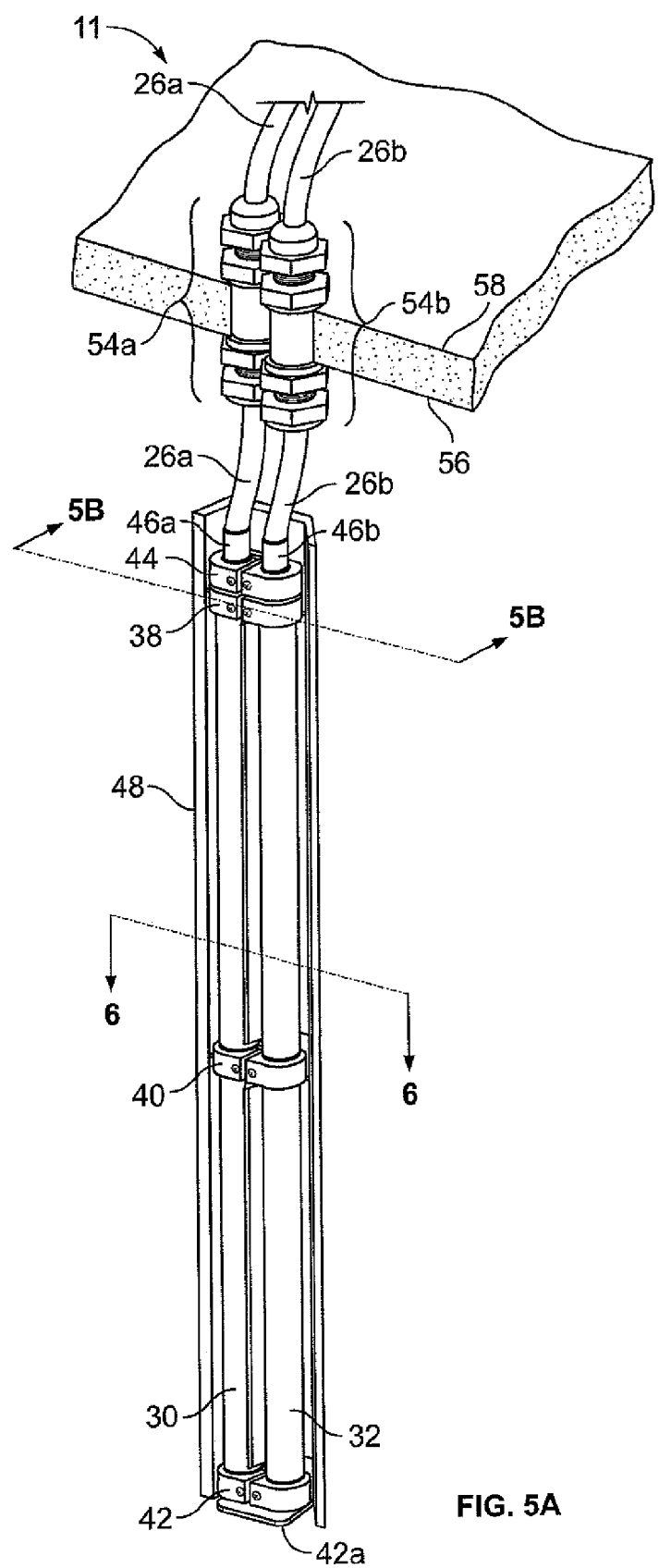
FIG. 5A is a front view of a pair of fiber optic luminaires and associated parts shown apart from the display case of FIG. 1.
Figure 5B:
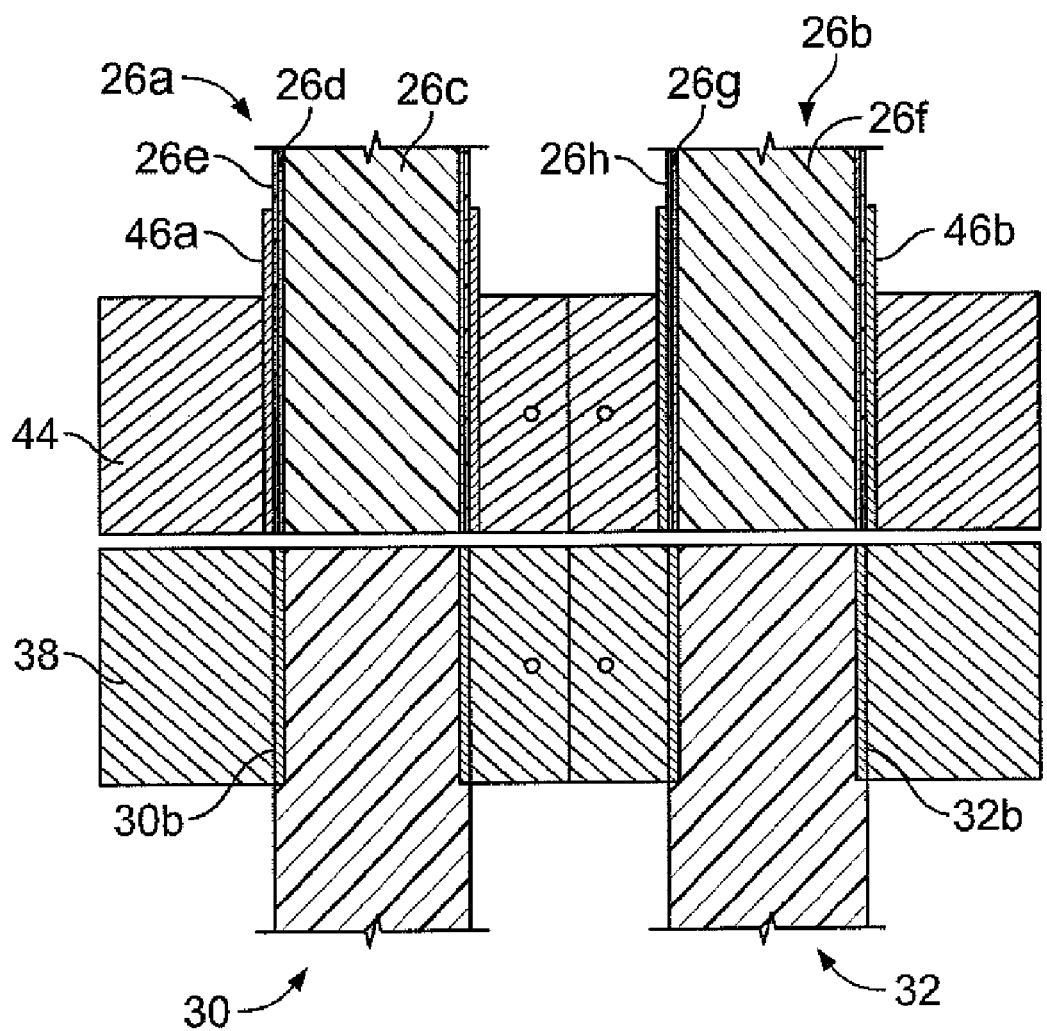
FIG. 5B is a detail, sectional view taken at Arrows 5B-5B in FIG. 5A.
Figure 5C:
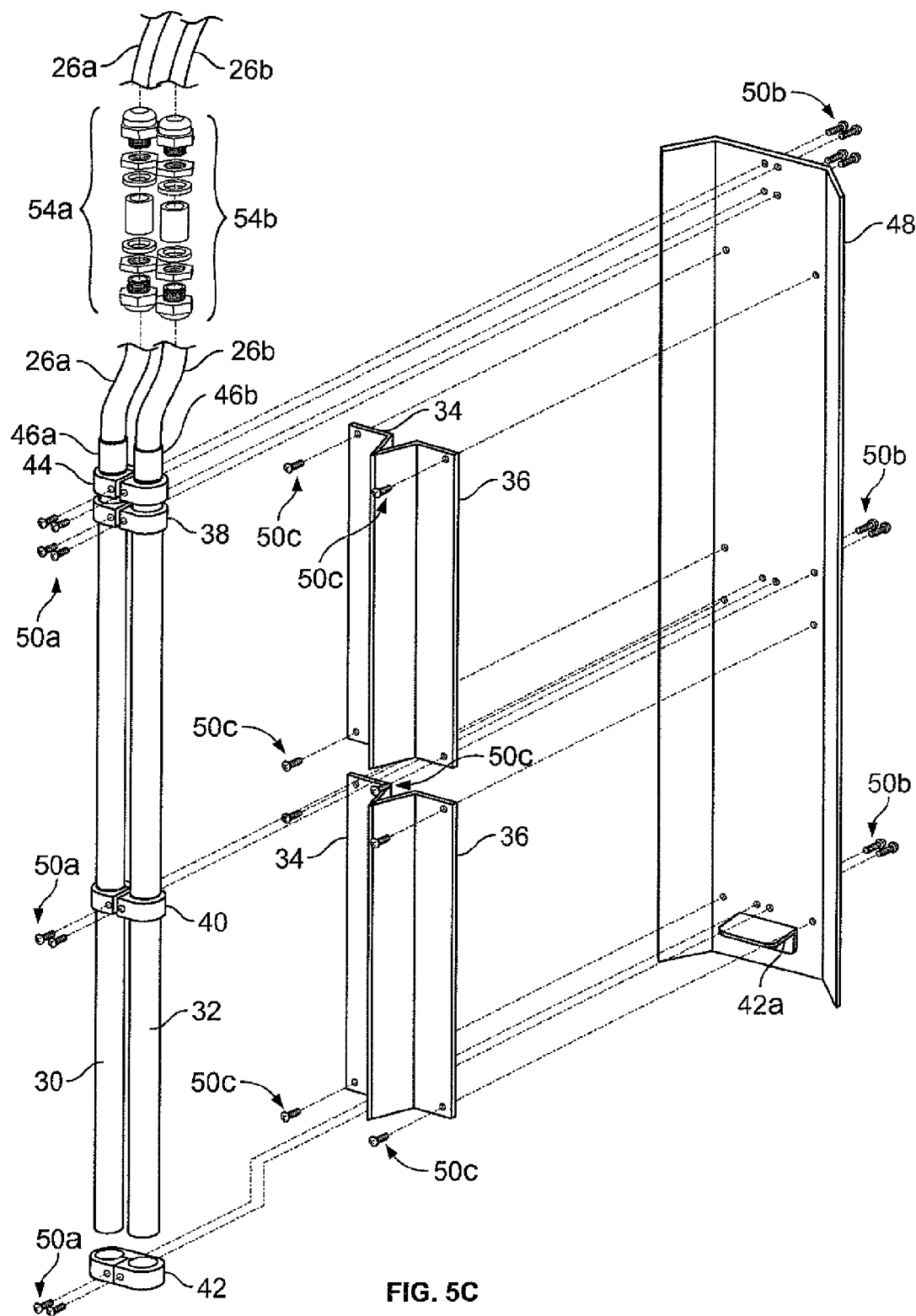
FIG. 5C is an exploded view of the structures shown in FIG. 5A.
Figure 6:
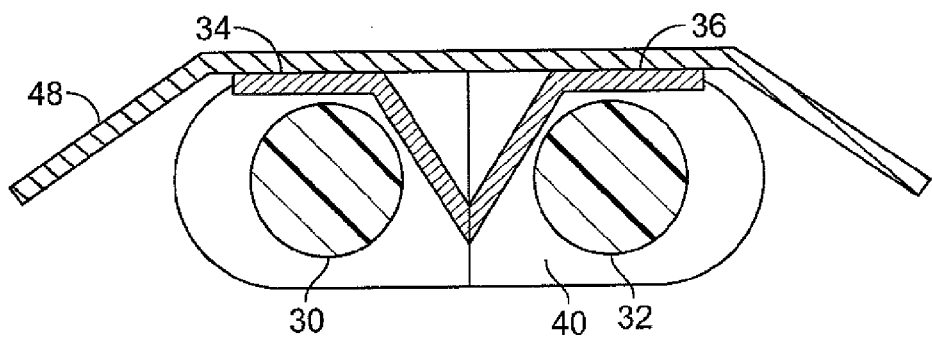
FIG. 6 is a sectional view taken at Arrows 6-6 in FIG. 5A.

FIGS. 5A, 5B, 5C and 6 show fiber optic luminaires 30 and 32. Referring to FIG. 1, such a pair of luminaires may be contained between doors 19 and 20, or between doors 20 and 21. As shown in FIG. 5A, left-hand luminaire 30 illuminates a target area (not shown) to the left of the luminaire, and right-hand luminaire 32 illuminates a target area (not shown) to the right of luminaire 32. As shown in FIGS. 5C and 6, each luminaire may be provided with respective reflectors 34 and 36. Such reflectors may be diffuse or specular. Reflectors 34 and 36 may be separate from each other or integral to each other. As shown in FIG. 5C, luminaires 30 and 32 may be held in place with upper clamp 38, middle clamp 40 and lower clamp 42. Clamps 38, 40 and 42 maintain desired lateral positions of the associated clamped portions of the luminaires. In addition, lower clamp 42 includes a horizontally inclined plate 42a for maintaining the vertical positions of the luminaires.

As best shown in FIG. 5B, the luminaires may be provided with claddings within the clamps, such as clamp 38. In particular, FIG. 5B shows a cladding 30b that may surround luminaire 30 within clamp 38; cladding 30b having a lower refractive index than the core of the luminaire. Similarly, a cladding 32b may surround luminaire 32 within clamp 38; cladding 32b having a lower refractive index than the core of the luminaire. The luminaires may be provided with similar cladding in their portions held within the other clamps, such as clamps 40 and 42 shown in FIG. 5A.

Clamp 44 (FIG. 5A-5C) holds the lower portions of fiber optic cables 26a and 26bcentered respectively above luminaires 30 and 32. As best shown in FIG. 5B, clamp 44 cooperates with sleeves 46a and 46b for aligning the bottom portions of fiber optic cables 26a and 26b. Sleeves 46a and 46b are preferably made of metal, and additionally serve to prevent kinking of the bottom portions of the fiber optic cables. As shown in FIG. 5B, cable 26a comprises a core 26c, a cladding 26d of lower refractive index than core 26c and a protective jacket 26e of PVC or vinyl, for instance. Similarly, cable 26b comprises a core 26f, a cladding 26g of higher refractive index material and a protective jacket 26h of PVC or vinyl, for instance.

A channel 48 may be conveniently used for mounting the luminaires in a display case. As shown in FIG. 5C, clamps 38, 40, 42 and 44 may be secured to channel 48, by bolts 50a, which is in turn secured to a structural member 12b or 12c (FIG. 1) by bolts 50b. The foregoing clamps secure the luminaires and their input fiber optic cables in position. Reflectors 34 and 36 may be secured to channel 48 by bolts 50c. Thus, channel 48 may be conveniently used for mounting the luminaire arrangement within a display case, either as an original mounting or a retrofit mounting.

As shown in FIG. 5A, feed-throughs 54a and 54b are used for feeding fiber optic cables 26a and 26b through the ceiling of container 11. In particular, these feed-throughs preferably seal cables 26a and 26b to at least the internal wall 56 of the container. It is preferred that feed-throughs also seal the cables to external wall 58 of the container.

Figure 5D:
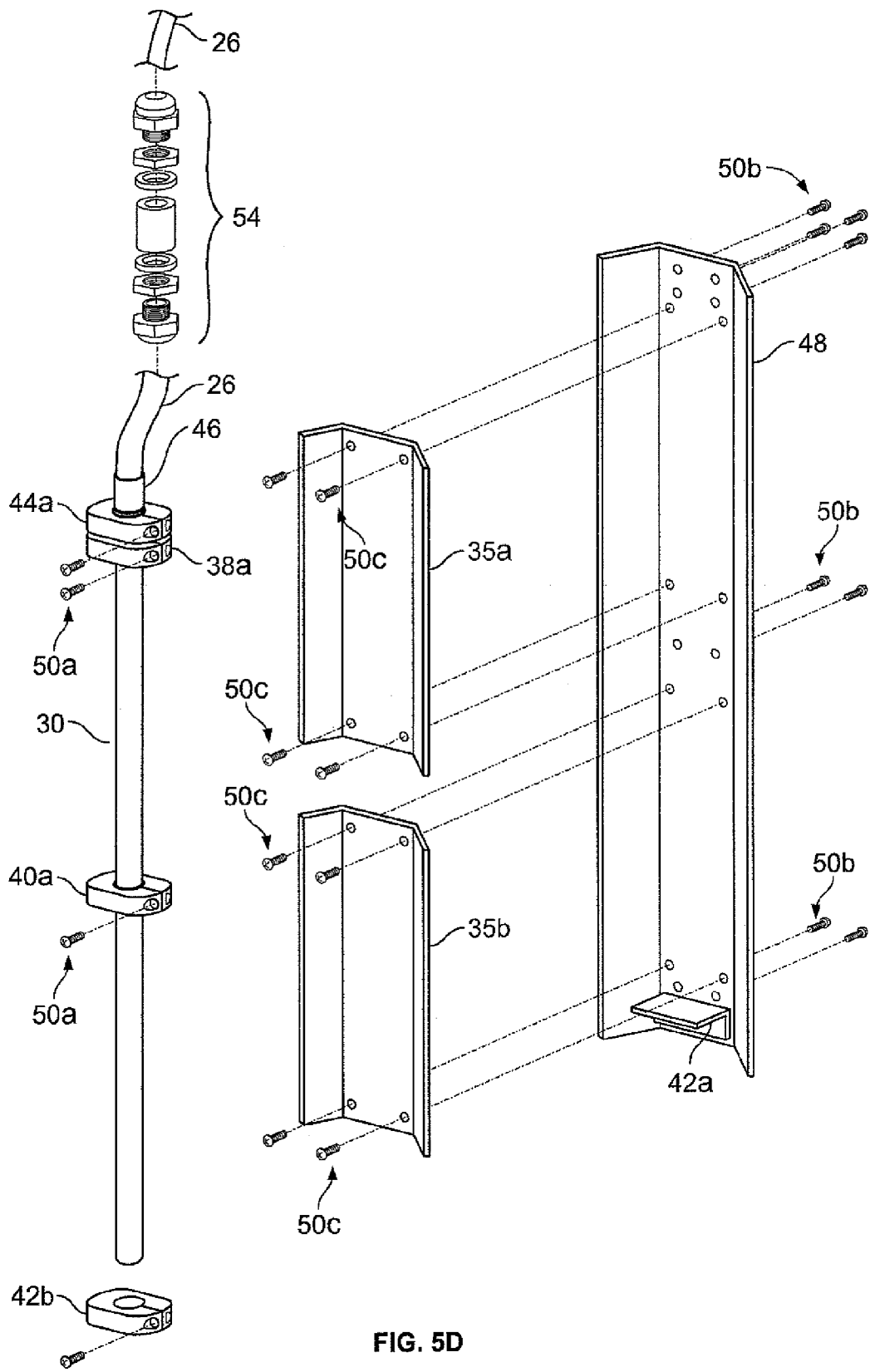
FIG. 5D is an exploded view similar to FIG. 5C but showing a single fiber optic luminaire and associated parts shown separate from the display case of FIG. 1.

FIG. 5D shows a single luminaire 30 and associated structures for use in the FIG. 1 display case to the left of door 19 or to the right of door 21—that is, at the left-most or right-most ends of the display case. Non-specular (diffusive) reflector 35a and 35b may have a different shape from non-specular reflectors 34 and 36 of FIG. 5C. Other than the possible use of a differently shaped reflector and the use of only a single luminaire, the structures of FIG. 5D are similar to those in FIG. 5C. Of course, single-luminaire clamps 38a, 40a and 42b are used in FIG. 5D rather than the double-luminaire clamps 38, 40 and 42 in FIG. 5C. Similarly, a single-cable clamp 44a is used in FIG. 5D rather than the double-cable clamp 44 in FIG. 5C.

Figure 7:
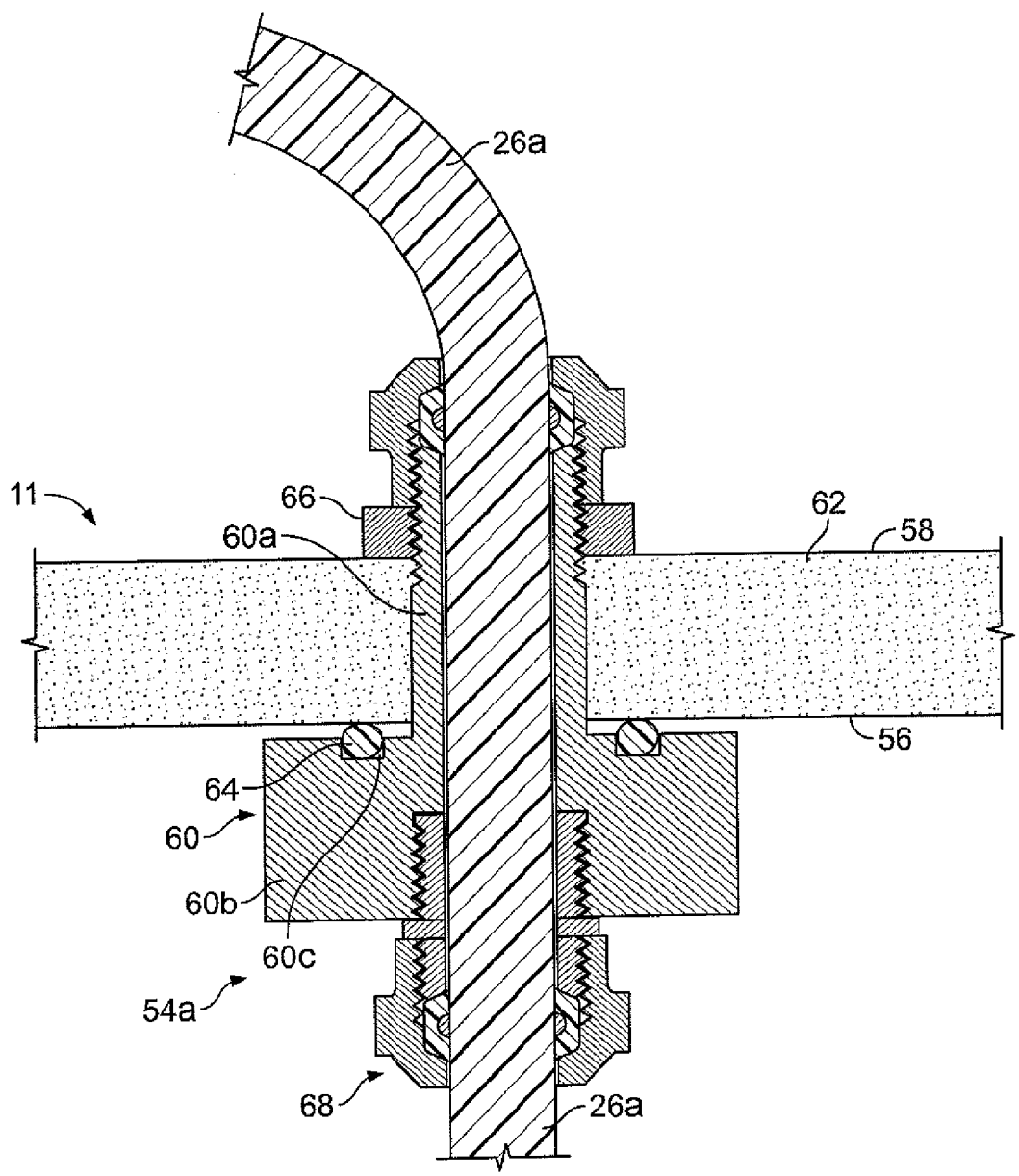
FIG. 7 is a vertical cross section of a feed-through and associated structure of FIG. 5A.

FIG. 7 shows feed-through 54a for feeding flexible fiber optic cable 26a through a wall (e.g., ceiling) of container 11. Feed-though 54a comprises a penetrating member 60 having a relatively narrow portion 60a passing through internal and external walls 56 and 58 (and thermal insulation 62 therebetween). This feed-through further comprises a relatively enlarged portion 60b with an upwardly (or axially) facing channel 60c for holding an O-ring 64 or bead of silicone or other sealant material. An externally threaded portion of relatively narrow portion 60a threadedly receives a nut 66 with sufficient tension as to compress O-ring 64 and seal enlarged portion 60b against internal wall 56. Meanwhile, a conventional compression fitting 68 is used to seal cable 26a against enlarged portion 60b.

Figure 8A:
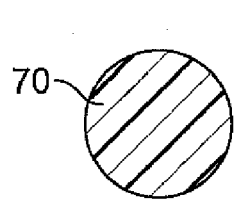
FIGS. 8A and 8B are cross sections of different types of luminaires.
Figure 8B:
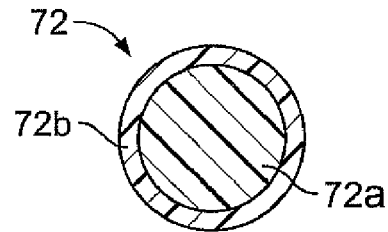

Luminaires 30 and 32 may preferably comprise solid fiber optic structures, such as an acrylic polymer rod. FIG. 8A shows a solid, single-strand luminaire 70, whereas FIG. 8B shows an alternative single-strand luminaire 72 having a core 72a and lower refractive index cladding 72b such as a fluoropolymer. Although the luminaires of FIGS. 8A and 8B are shown with circular cross sections, high volume (and hence low cost) molding of luminaires with other cross sections can be carried out. Other cross sections could impart more directionality out light output to a luminaire than with a circular cross section.

Figure 9:
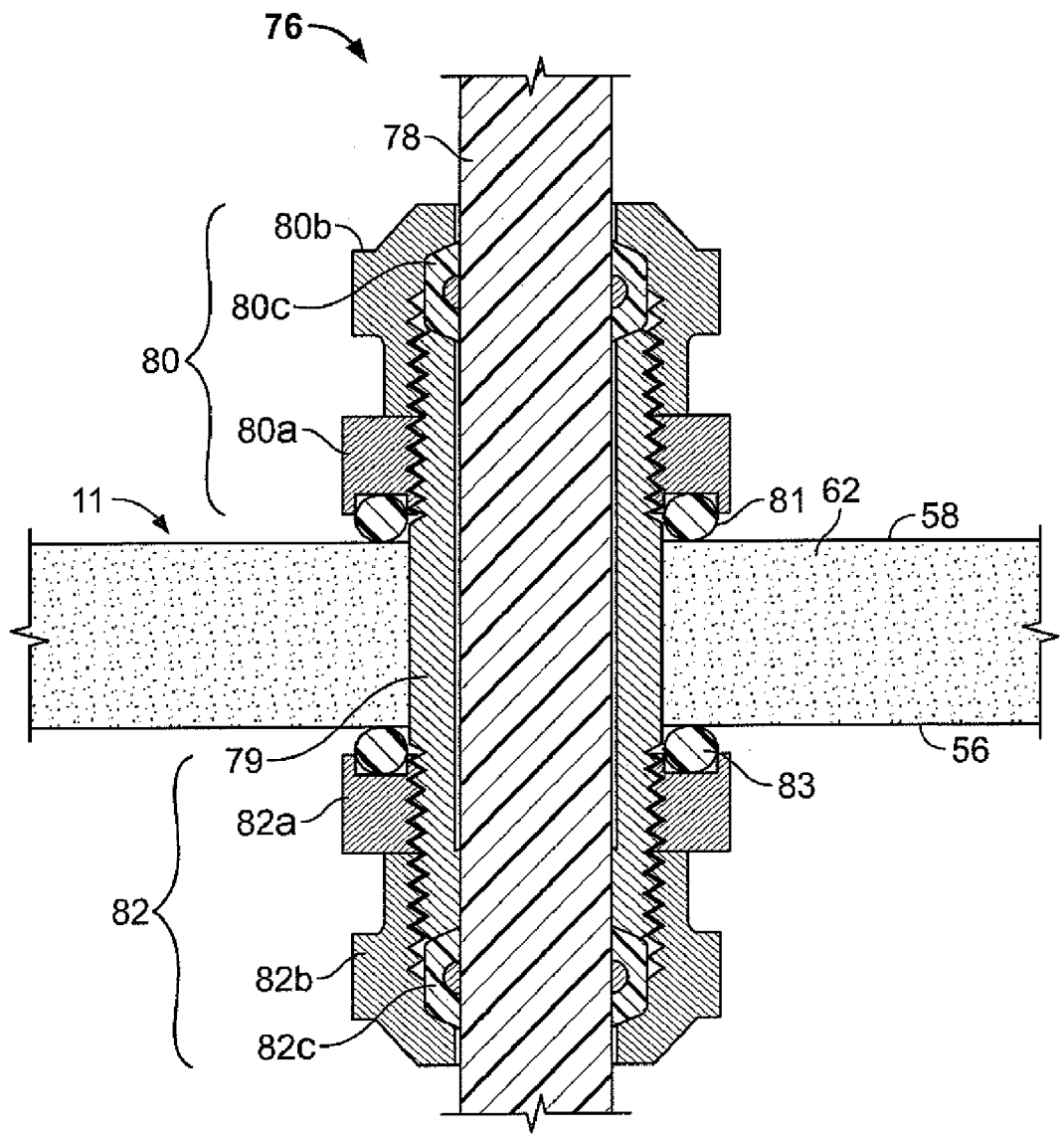
FIG. 9 is a vertical cross section of a feed-through and associated structure that is alternative to that shown in FIG. 7.

FIG. 9 shows a preferred feed-through 76 for feeding through container 11 a fiber optic structure 78. Fiber optic structure 78 may be a glass or quartz rod used to thermally isolate the heat of a lamp (and ballast) from the interior of container 11 or from a thermally sensitive luminaire (not shown) that receives light from structure 78. Alternatively, fiber optic structure 78 could be an extension of a luminaire upwardly (in the orientation shown) through the ceiling of container 11, or a flexible fiber optic cable that feeds light to a luminaire (not shown) in the interior of the container.

Feed-through 76 comprises a central cylindrical penetrating part 79 ensheathing fiber optic structure 78, upper and lower compression fittings 80 and 82, and O-rings 81 and 83.

Compression fitting 80 includes a threaded nut 80a pressing compressible O-ring 81 into sealed relation against external wall 58 of container 11 and penetrating part 79. Compression fitting 80 further includes a threaded nut 80b for compressing resilient material 80c into sealed relation against penetrating part 79 and fiber optic structure 78. Compression fitting 80 cooperates with compression fitting 82, whose parts 82a, 82b, 82c and O-ring 83 correspond to parts 80a, 80b, 80c and O-ring 81 of compression fitting 80. In particular, O-rings 81 and 83 become compressed only when nuts 80a and 82a are rotated until they are sufficiently close to each other.

As just described, feed-through 79 seals fiber optic structure 78 against both internal and external walls 56 and 58 of the container.

Figure 10:
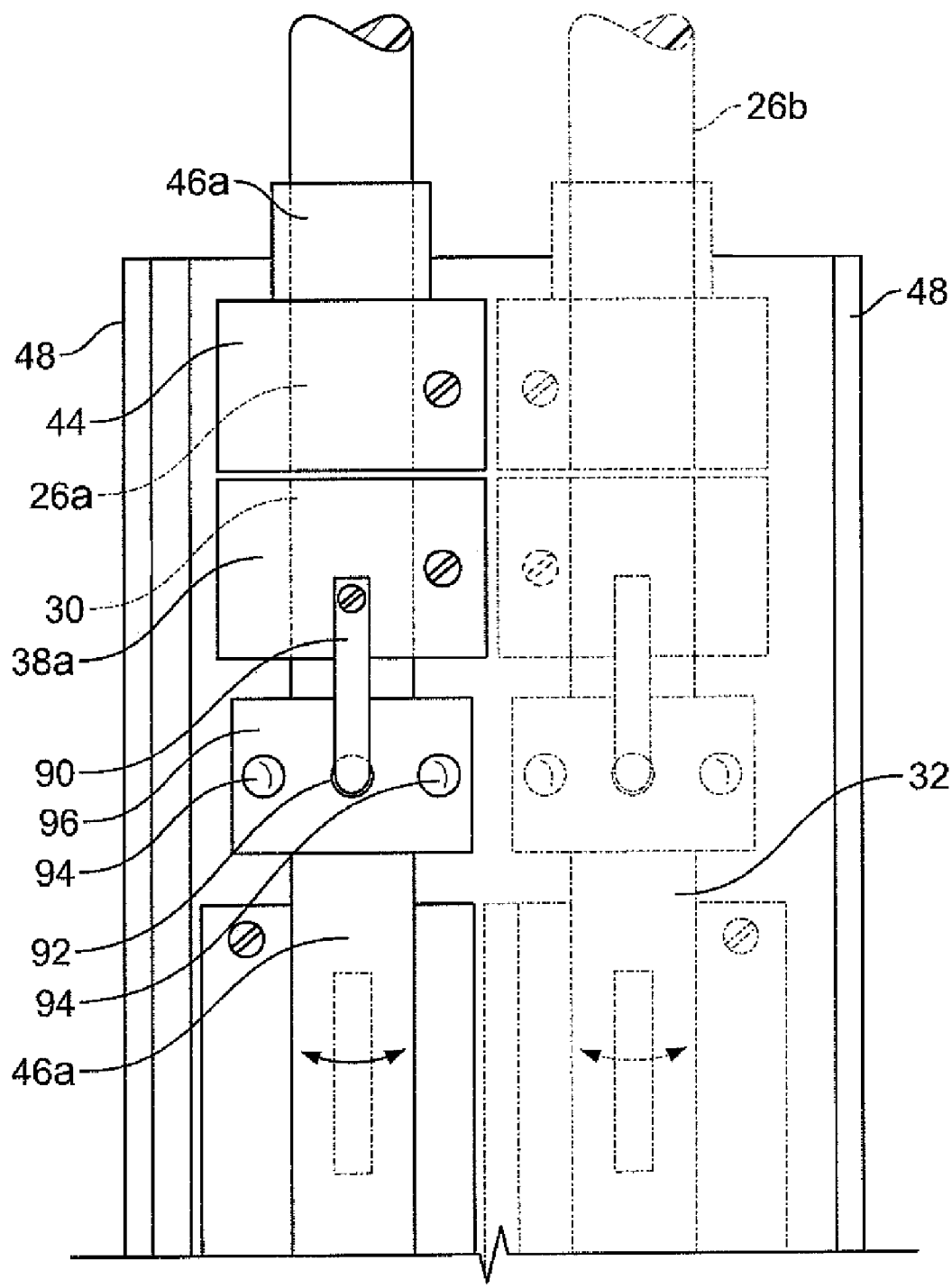
FIG. 10 is a perspective view a preferred arrangement for joining fiber optic structures to luminaires, taken at the upper end of a luminaire.

FIG. 10 shows a pair of luminaires 30 and 32 that are rotatable about their respective axes. This allows each luminaire to be rotated as desired for moving the peak illuminance laterally across contents of the display case of FIG. 1. This is especially desirable as the contents to be displayed are moved deeper into the display case or shallower into the case. As the contents are so moved, the location of the peak illuminance can be shifted so as to properly illuminate the contents. Preferably, the luminaires will be releasably held in a desired position. Means for accomplishing this would include electro-mechanical means for holding the luminaire in position, frictional means for holding the luminaire in position, or mechanical means such as the use of a set screw for holding the luminaire in position.

More preferably, luminaires will be releasably held in any of several predetermined positions, such that the luminaires can be rotated by hand alone into any of such positions. Such releasable holding can be accomplished as follows. In FIG. 10, luminaire 32 is shown in phantom, and its description will be omitted since it may use the same type of arrangement for being rotated as luminaire 30. As in FIG. 5A, a clamp 44 holds the lower end of fiber optic cable 26a. Cable 26a could be replaced with a glass or quartz rod, for example. Clamp 44 cooperates with sleeve 46a protecting the lower end of the cable. A clamp 38a, modified from clamp 38 shown in FIG. 5A, has a resiliently biased arm 90 whose lower portion comprises a detent 92, which may be shaped in the form of a semi-sphere, for instance. Detent 92 may be pressed into any of various holes 94 extending outwardly along band 96. In this way, a user can easily grasp the luminaire and rotate detent 92 into any of holes 94, for instance, which will be held in such hole by resiliently biased arm 90. However, the user can use manual (hand) force to rotate the luminaire into another predetermined position, where it will be releasably held until another manual force again rotates the luminaire. Typically, holes 94 would be more closely spaced than shown in FIG. 10.

Figure 11:
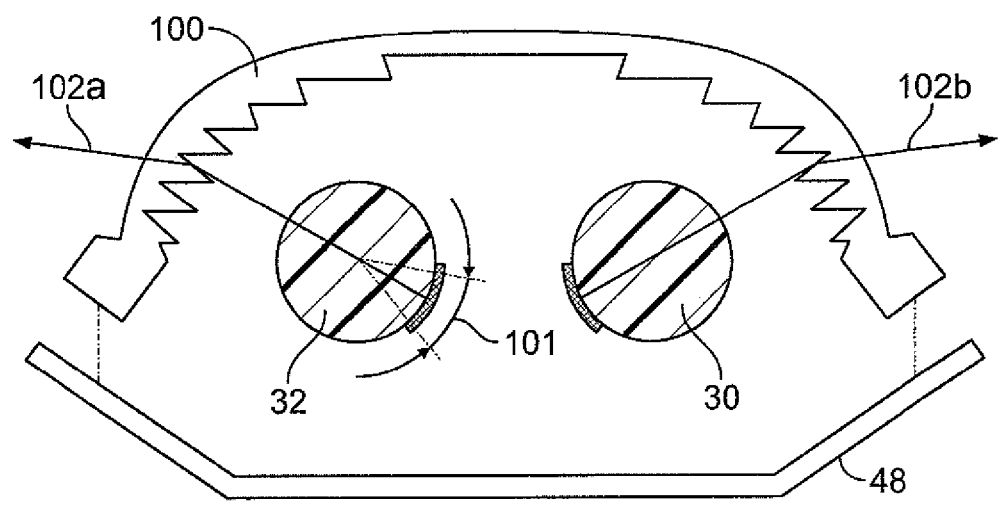
FIG. 11 shows a cross section of a pair of luminaires, together with a transparent cover for the luminaires.

FIG. 11 shows luminaires 30 and 32 together with a transparent cover 100. Transparent cover 100 protects the surface of the luminaires from soiling or injury. Beneficially, transparent cover 100 may also comprise, or be associated with, a lens, such as the Fresnel lens shown. As a Fresnel lens, transparent cover 100 redirects representative light rays 102a and 102b as the rays pass through the lens, as shown. Such reorientation of the light rays permits steering of the peak of light distribution deeper or shallower into the display case as desired. The transparent cover can additionally act as a light diffuser to minimize direct views of the luminaire and to soften specular images of the luminaire that may be seen as reflections in the contents of the display case.

Secondary optics, such as a Fresnel lens, becomes especially valuable when the intensity (lumens/steradian) from a round rod luminaire is insufficient to achieve a desired target surface illuminance. This typically occurs when the angle of light hitting the target surface area is large, which is typical when the freezer door is wide (e.g., 91 cm) and the distance to the target surface is small (e.g., 10 cm). The Fresnel lens can increase the intensity of the light directed toward the target surface and thereby increase the target surface illuminance. With a round rod luminaire, the peak intensity occurs when the radial paint stripe width (e.g., the illustrated radial angle 101 for a light extractor) is approximately 20 to 30 degrees, so the Fresnel lens is often used with narrow paint stripes.

Figure 12:
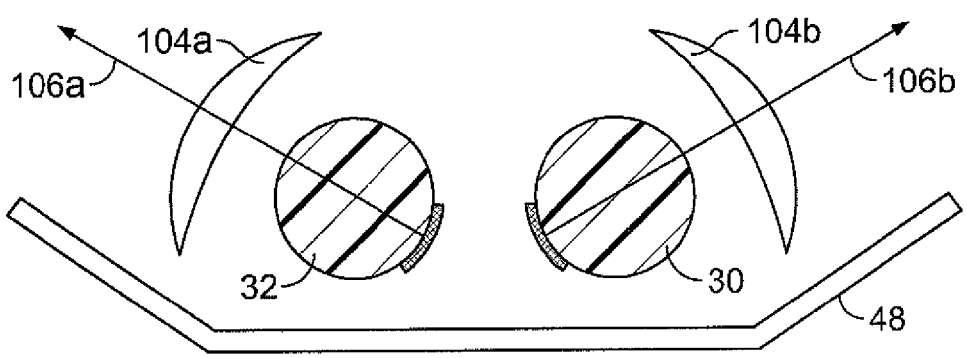
FIG. 12 is a cross section similar to FIG. 11 but showing a different type of transparent cover for the luminaires.

FIG. 12 shows luminaires 30 and 32 with respective transparent covers 104a and 104b. Transparent covers 104a and 104b may comprise an optical lens for making the light distribution from the luminaires, e.g., rays 106a and 106b, more sharply peaked.

Figure 13:
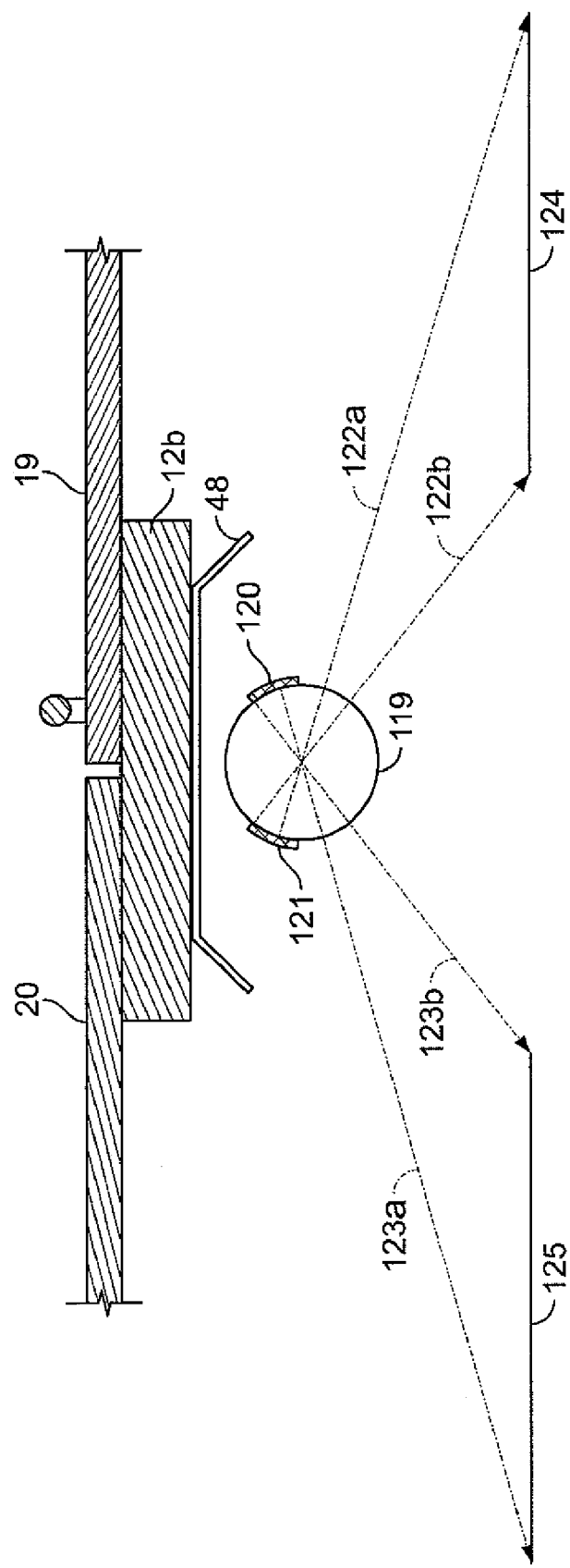
FIG. 13 is a detail view of a modified luminaire and associated structure taken at Arrows 13-13 in FIG. 1.
Figure 14B:
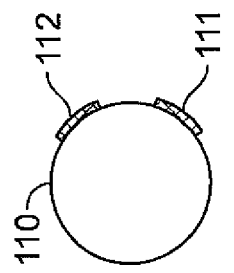
FIG. 14B is sectional view of a luminaire such as shown in FIG. 14A
Figure 14A:
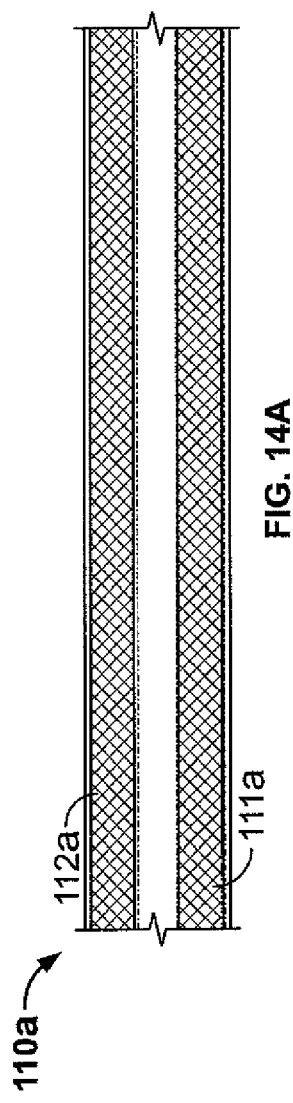
FIG. 14A is a side view of a luminaire.
Figure 14D:
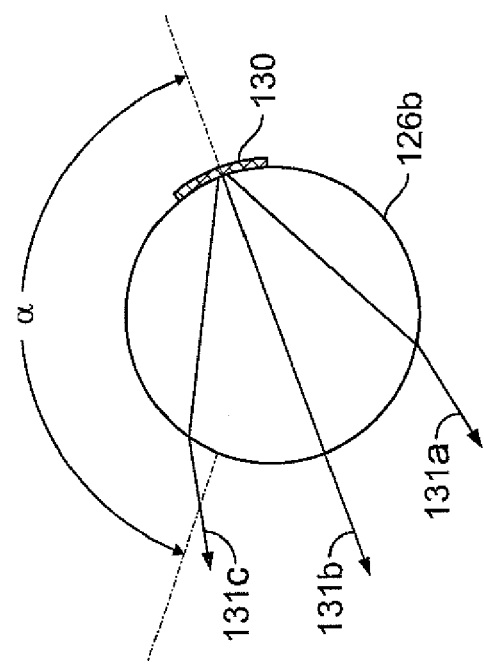
FIGS. 14C and 14D are cross sectional views of luminaires.
Figure 14C:
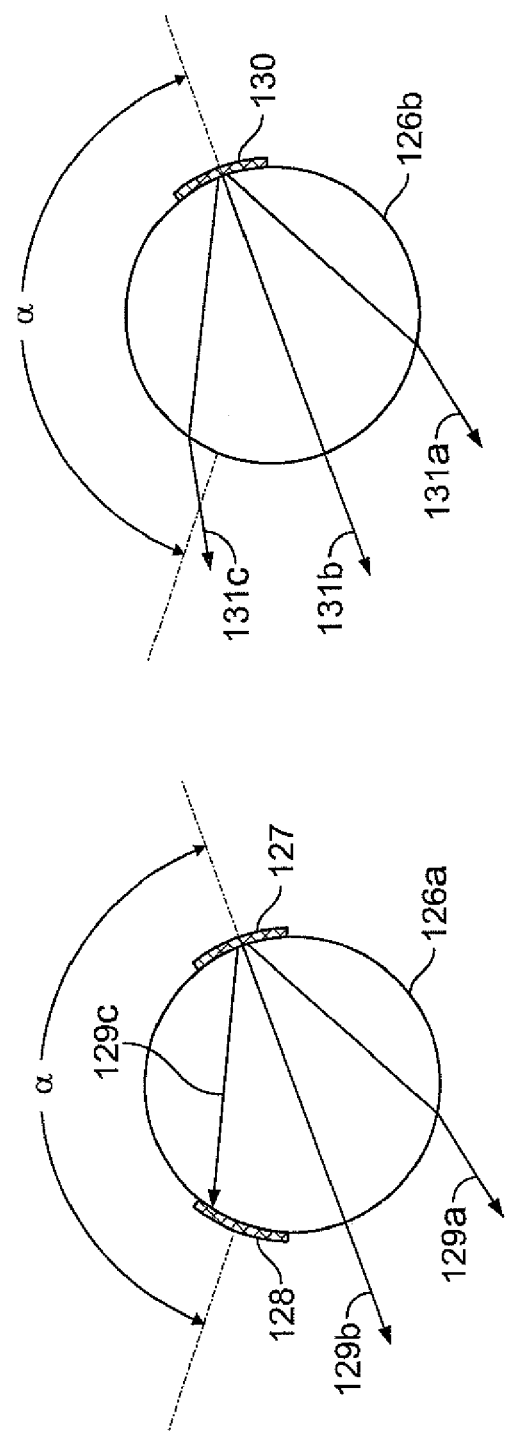

FIGS. 13-14C concern the use of a single luminaire to illuminate two laterally adjacent target areas, and a problem of light blocking that might occur in such luminaire.

FIG. 13 shows a portion of the display case of FIG. 1 with doors 19 and 20. In a variation from the display case of FIG. 1, only a single luminaire 119 is mounted on channel 48, which is secured to structural member 12b. The figure also shows luminaire 119 with light-extraction regions 120 and 121 of the side-light emitting portion. Light rays (e.g. 123a and 123b) from light-extraction region 120 illuminate a desired target area 125, while the light rays (e.g. 122a and 122b) illuminate a laterally adjacent desired target area 124.

Using a single luminaire as in FIG. 13 requires more lumens of light to be supplied to the luminaire than to each of the two luminaires shown in FIG. 5A, for instance. Typically, a larger diameter luminaire would be used for the FIG. 13 embodiment.

FIG. 14A shows a luminaire 110a shows with light-extraction regions 111a and 112a, arbitrarily shown as cross-hatched. FIG. 14B shows a luminaire generally designated 110, to refer to luminaire 110a of FIG. 14A, for instance. FIG. 14B also shows a pair of light-extraction regions generally designated as 111 and 112, to refer to regions 111a and 112a in FIG. 14A, for instance. The light-extraction regions 111a and 112a are arranged longitudinally along the length of the luminaire 110a. As used herein, a single light-extraction region provides illumination to a single continuous target area along some part of the length of the luminaire. In accordance with an aspect of the invention, the light is extracted from the side-light emitting portion by light-extraction regions 111a and 112a to illuminate a pair of respective pair of laterally adjacent target areas (not shown).

In FIG. 14A, light-extraction regions 111a and 112a are continuous along the length of the luminaire. The extraction efficiency within a light-extraction region may be constant within each region or may vary within the region. Spatial variations in extraction efficiency are used to adjust the distribution of light at the target. In many geometries of light-extraction regions 111a and 112a, light rays (not shown) from one light-extraction regions are blocked by the other light-extraction region, resulting in re-scattering or absorption of the light rays that would otherwise fall on a desired target area. This blockage problem is shown in FIGS. 14C and 14D in connection with luminaires 126a and 126b.

In FIG. 14C, luminaire 126a has two adjacent light-extraction regions 127 and 128 arranged in a manner to illuminate two separate target areas of the contents of the display case. Light-extraction means 127 illuminates a target area to its left, whereas light-extraction region 128 illuminates a target area to its right. The light-extraction regions 127 and 128 are spaced from each other around a perimeter of said side-light emitting portion taken orthogonally to main optical axis of said side-light emitting portion. In particular light-extraction regions 127 and 128 are spaced from each other at an angle of a around the perimeter of the side-light emitting portion. Generally, the light rays (e.g. 129a and 129b) from the light-extraction region 127 illuminate the desired target area, but a portion of light rays (e.g. 129c) from the light-extraction means 127 are blocked by the other light-extraction region 128. These blocked light rays are re-scattered by the light-extraction means 128 with some absorption. These re-scattered light rays (not shown) add with the light rays (not shown) from the light-extraction region 128 to illuminate the target area to the right of that region. Typically, the amount of light rays blocked depends upon the angular separation a between the light-extraction regions 127 and 128. As the angle α increases, the amount of blockage of the light rays tends to increase.

FIG. 14D shows a luminaire 126b with a single light-extraction region 130. The light-extraction region 130 illuminates a desired target area of the contents of the display case with light rays (e.g. 131a, 131b, and 131c). The light-extraction region formed in the same relative position as light-extraction region 127 of FIG. 14C. In the absence of an adjacent light-extraction region, light-extraction region 130 illuminates the desired target area with light rays (e.g. 131a, 131b, and 131c) without any blockage as in FIG. 14C.

Returning to FIG. 14A, the blocked light rays (not shown) by the adjacent light-extraction region adds to the illuminance on the respective target area being illuminated by the light-extraction region blocking the light rays. Some of the light rays (not shown) from light-extraction region 111a are being blocked by the light-extraction region 112a and some of the light rays (not shown) are being blocked by the light-extraction region 111a. This blockage problem can be solved by dividing the light-extraction region 111a and 112a in longitudinal segments along the length of the luminaire in such a manner such that the blockage is reduced considerably, resulting in increase of the illuminance on the desired target area.

FIG. 14E shows a luminaire 110b with light-extraction regions 111b and 112b. To overcome the above-mentioned blockage problem, the light-extraction regions are spatially divided into segments with gaps between the segments along the length of the luminaire 110b. Light-extraction region 111b is spatially divided into segments 113 with a gap 113a between adjacent segments Similarly, light-extraction region 112b is spatially divided into segments 114 with a gap 114a between adjacent segments. The longitudinal dimension of gaps 113a and 114a is at least 20 percent of the length of the neighboring segments 113 and 114 respectively. The segments 113 are aligned in such a manner so that each gap 113a is at least 20 percent of the longitudinal dimension of a segment 114 at the same point along the longitudinal axis of luminaire 110b.

The longitudinal dimension of gaps 113a and 114a of FIG. 14E and similar gaps discussed in the following figures are preferably greater than the radial width of their respective light-extraction region along the length of the luminaire. More preferably, the longitudinal dimensions of such gaps are greater than twice the radial width of their respective light-extraction region along the length of the luminaire. Further, the target areas illuminated by the light-extraction regions (e.g., 110a, 110b, FIG. 14E) are spaced from the luminaire by at least 5 times the longitudinal dimension of such gaps. This is to assure that the light-extraction regions appear as continuous from the viewpoint of the target areas.

FIG. 14F shows a luminaire 110c with light-extraction regions 111c and 112c. The light-extraction regions are spatially divided into segments 115 and 116, respectively. The segments 115 and 116 have respective gaps 115a and 116a between them. The segments 115 and 116 are arranged in such a manner so that the longitudinal dimension of the gaps 115a and 116a is equivalent to the longitudinal dimension of the adjacent segment of the adjacent light-extraction region.

FIG. 14G shows a light luminaire 110d with light-extraction regions 111d and 112d. The light-extraction regions are spatially divided into segments 117 and 118, respectively. The segments 117 and 118 have gaps 117a and 118a between them, respectively. The gaps 117a and 118a are relatively longer than the gaps between the segments in FIGS. 14E and 14F. This kind of spatial division of the light-extraction regions greatly reduces the blockage of the light by the adjacent light-extraction region, which results in an increase of illuminance on the desired target area.

The light extractor on a luminaire can be arranged to preferentially extract light from the luminaire and direct such light in multiple radial directions along the length of the side-light emitting portion. This is shown in FIGS. 15A and 15B.

Figure 15A:
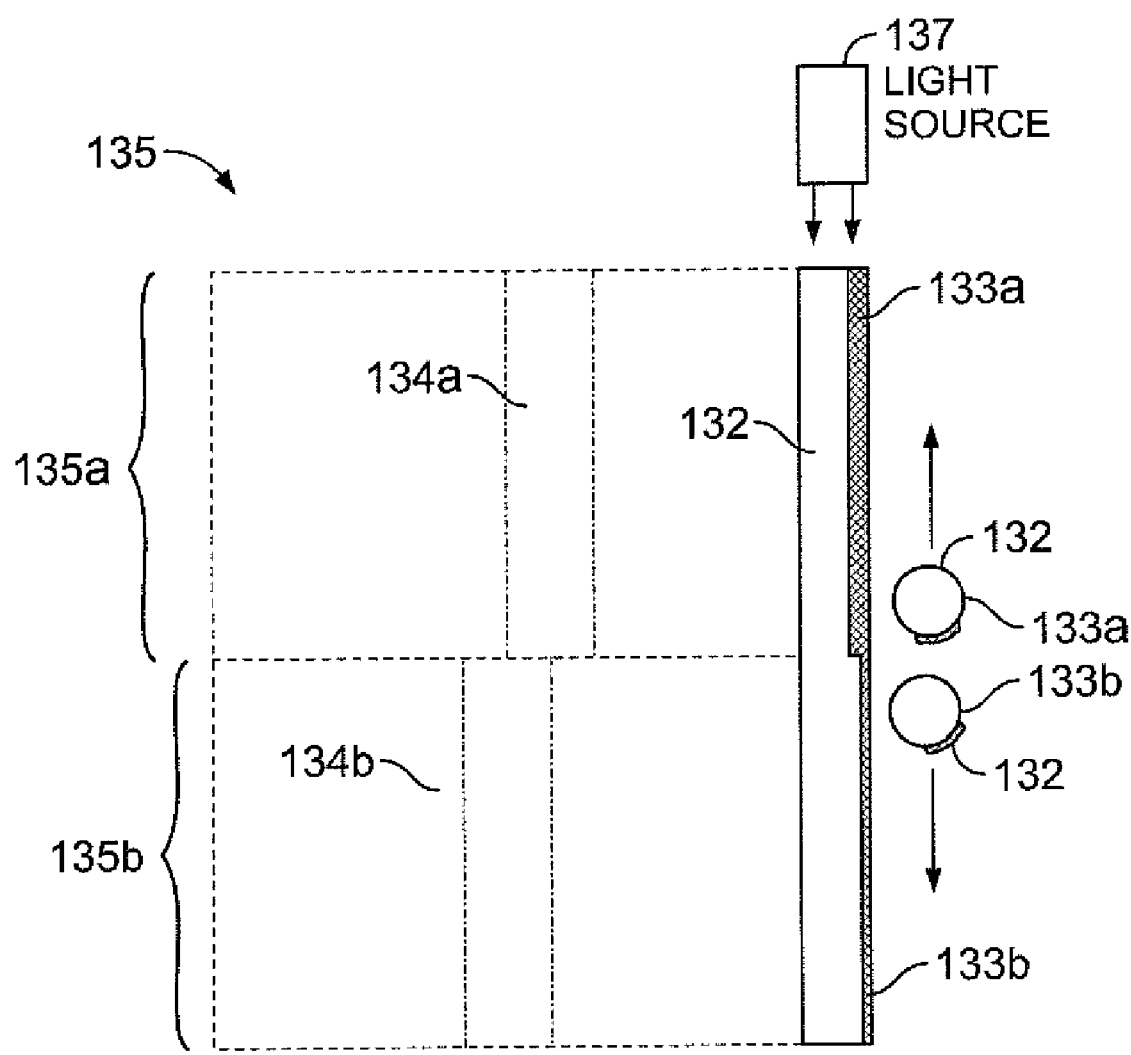

FIG. 15A is a simplified view of view port 19a and associated luminaire of the display case 10 of FIG. 1. A desired target area 135 is illuminated by luminaire 132. The luminaire receives light from a light source 137, which is extracted by light-extraction region 133 comprising portions 133a and 133b, arbitrarily shown cross-hatched. Light-extraction portion 133a of luminaire 132 illuminates a vertically upper portion 135a of target area 135 with a peak illuminance 134a. Light-extraction portion 133b illuminates lower portion of target area 135 with a peak illuminance 134b. Target area 135 is vertically continuous. To the right of vertically oriented luminaire 132 there are shown a cross section of the luminaire with light-extraction portion 133a, for describing the upper half of the luminaire, and a cross section of the luminaire with light-extraction portion 133b describing the lower half of the luminaire. These cross sections help to more clearly show the relative radial positions of light-extraction portions 133a and 133b on the luminaire. Such radial displacement of portion 133b relative to portion 133a results in the shift of peak illuminance 134a to peak illuminance 134b on the target area 135.

FIG. 15B is a simplified view of view ports 20a and 21a of the display case 10 of FIG. 1 and an associated but modified luminaire. A light source 140 provides light to a luminaire 142. In luminaire 142, a light-extraction region 142a illuminates a target area 150 at the upper left of the luminaire, having a peak illuminance 148a. A second light-extraction region 142b illuminates a separate target area 152 at the lower right of the luminaire, having a peak illuminance 148b. The single luminaire of FIG. 15B can illuminate target areas on different lateral sides of the luminaire. The cross sections of luminaire 142 on either side of the vertically shown luminaire more clearly show the radial displacement of light-extraction regions 142a and 142b from each other.

A preferred light extractor comprises a layer of paint exhibiting Lambertian extraction and having a binder with a refractive index about the same as, or greater than that of, a core. Suitable light-extraction particles are added to the paint, such as titanium dioxide or many other materials as will be apparent to those of ordinary skill in the art. Preferably, the paint is an organic solvent-based paint.

Extractors of paint output most of their light in a preferred radial direction from an elongated luminaire. A textured type of extractor could alternatively be used, wherein the surface of the luminaire is textured by molding, laser etching, or chemical etching. Some textured extractors can extract light with a higher directionality than paint, but may introduce artifacts into the light output, which requires a diffuser to mask from view.

Preferred light-extractors and formulation of gradients of their efficiency along an elongated luminaire, and along a radial perimeter of a luminaire are described in the following U.S. patent applications having some common inventors with the present application, and assigned to the same joint owners as the present application:

U.S. patent application Ser. No. 11/366,711 filed 2 Mar. 2006 for Luminaire with Improved Lateral Illuminance Control by W. Cassarly et al.

U.S. patent application Ser. No. 11/108,279 filed 18 Apr. 2005 for Efficient Luminaire with Directional Side-Light Extraction by W. Cassarly et al.

The present joint owners of the foregoing applications and of the present application are Fiberstars, Inc. and Optical Research Associates. The entireties of the disclosures of the foregoing applications are hereby incorporated by reference.

Figure 16:
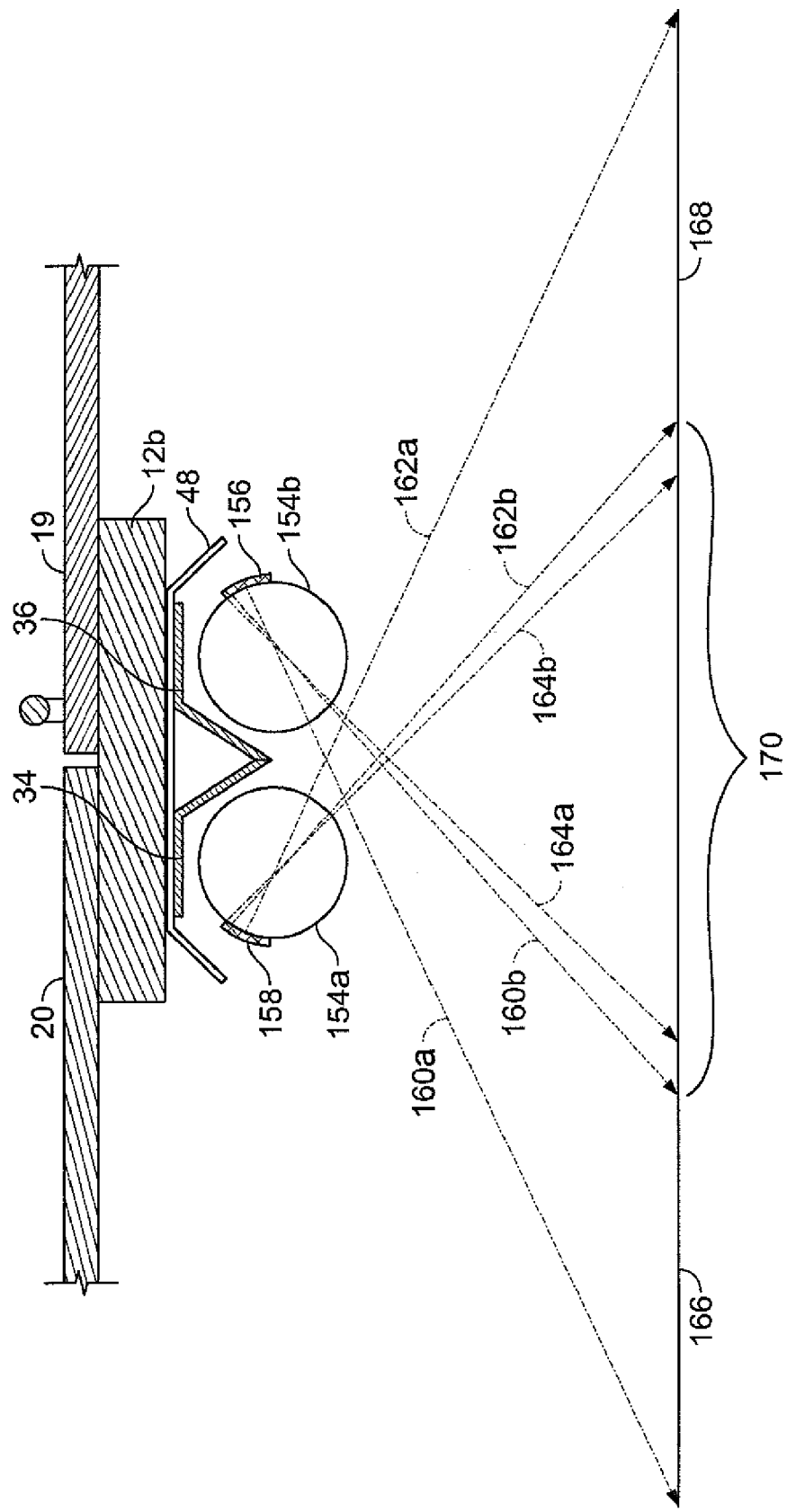
FIG. 16 is a detail view of a luminaire and associated structure taken at Arrows 13-13 in FIG. 1.

FIG. 16 shows a portion of the display case of FIG. 1 with doors 19 and 20, and illustrates a region of relatively low level light behind structural member 12b. As shown, luminaires 154a and 154b are mounted on channel 48, which is secured to structural member 12b. Light rays (e.g. 160a and 160b) originating from a light-extraction region 156 on luminaire 154b illuminate a desired target area 166. Target areas 166 and 168 lie in a plane parallel to the view port of doors 19 and 20, the view ports being shown in FIG. 1 as 19a and 20a. Light rays (e.g. 162a and 162b) originating from light-extraction region 158 on luminaire 154a illuminate a desired target area 168. In the arrangement shown, peak illuminance on target areas 166 and 168 is at least 50 percent greater than peak illuminance on non-target area 170 lying between the target areas in the same plane.

Various benefits arise because the luminaires in both FIGS. 13 and 16 are blocked from view for a person directly in front of the luminaire(s). In FIG. 13, a person directly in front of the display case and luminaire 119 would not see luminaire 119 owing to the interposition of structural member 12b and channel 48. By "directly in front" means a person viewing the luminaire along a plane intersecting the full length of the side-light emitting portion and being orthogonal to the plane of doors 19 and 20. Similarly, in FIG. 16, a person directly in front of the display case and luminaires 154a and 154b would not see the luminaires owing to the interposition of structural member 12b and channel 48. By placing the luminaires out of direct view, a person is not subjected to bright light from the luminaires, providing an aesthetic advantage.

Additionally, the fiber optic luminaires more efficiently direct light onto desired target areas. This is due to their extraction of light in a highly directional manner. This can be appreciated from referring to light-extraction regions 120 and 121 (FIG. 13) each of which covers a limited angle around the circumference of their associated luminaire 119. Either a single light-extraction region would be used for directing light to a single target area, or both light-extraction regions would be used for directing light to two separate target areas as shown in FIG. 13. Compared with a traditional fluorescent lamp, a fiber optic luminaire of one aspect of the invention will typically provide the same illuminance on target area(s) with fewer lumens of light. Thus, referring to FIG. 16, a fiber optic luminaire of one aspect of the invention will provide relatively less light to non-target area 170 than will a fluorescent lamp.

Further, fiber optic luminaires of one aspect of the invention may deliver light to the target area more efficiently than fluorescent lamps since they can have smaller cross-sectional dimension(s) and are thereby less likely to block light which strikes a reflector. For instance, a fiber optic luminaire typically would be about 19 mm, or preferably 15 mm, or less in diameter (for a round luminaire) compared with 25-37 mm diameter for a typical fluorescent lamp. Because the reflector must often be placed close to the fluorescent lamp, a substantial amount of light will restrike the fluorescent lamp after hitting the reflector. The slimmer luminaire can better accommodate use of reflectors, such as reflectors 34 and 36.

Figure 17:
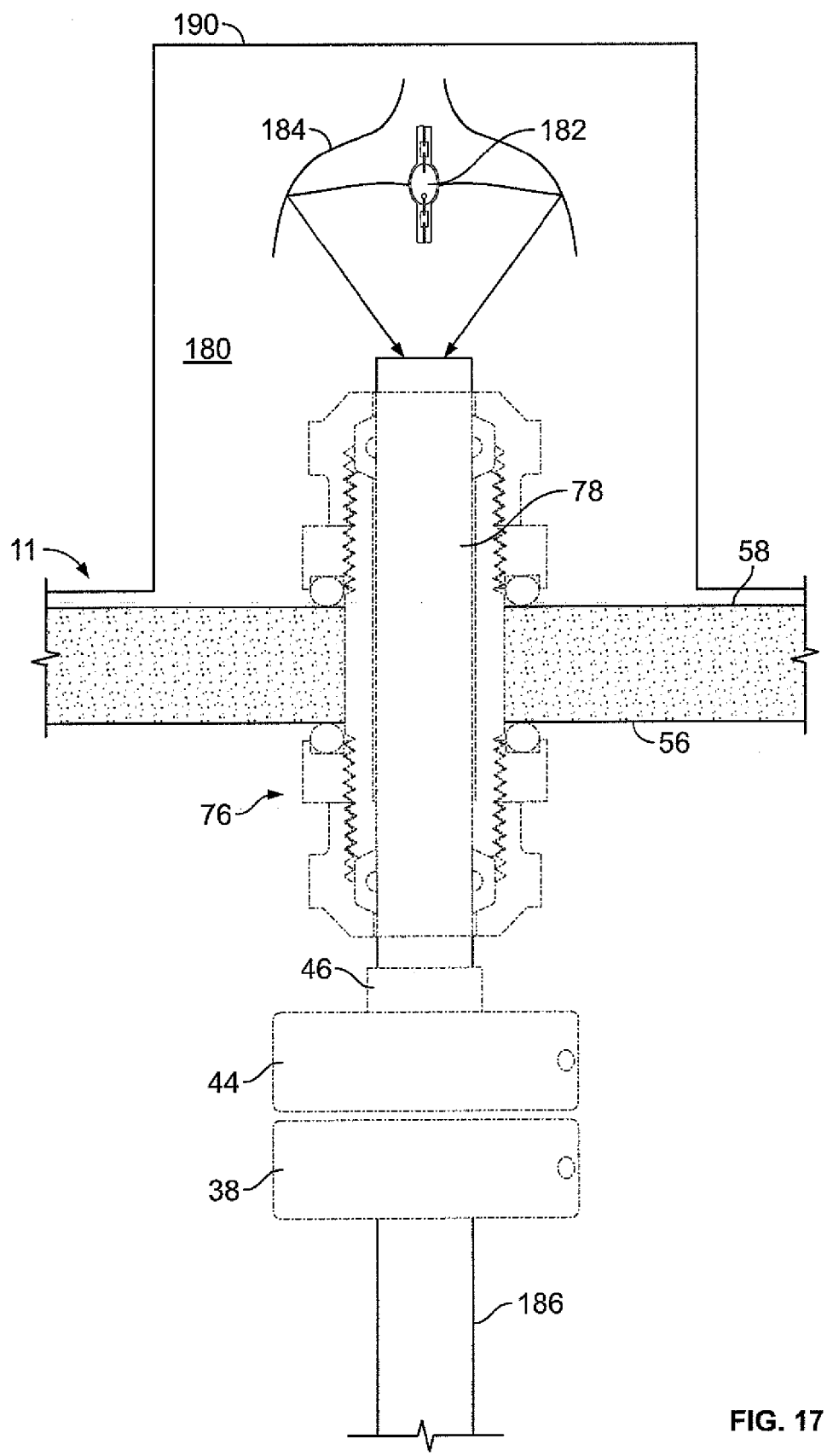
FIG. 17 is a detail view, partially in section, of a light-delivery system that may replace the feed-through and associated light-delivery structures shown in FIG. 1.

FIG. 17 shows a light-delivery system 180 that may replace the feed-through 76 and associated light-delivery structures shown in FIG. 1. Light-delivery system 180 comprises an HID lamp 182 with a collector 184 for collecting light along a main optical axis coinciding with the main optical axis of a luminaire 186. HID lamp 182 may comprise a metal halide lamp, by way of example. Collector 184 provides light to fiber optic structure 78, which may be embodied in different forms as described above in connection with FIG. 9. In the embodiment shown in FIG. 17, fiber optic structure 78 provides light to a separate luminaire 186. Structure 186 is secured by clamp 38 and the bottom portion of fiber optic structure 78 is secured by clamp 44 and sleeve 46. Feed-through 76 is used in the same manner as in FIG. 9 above.

HID lamp 182 and collector 184 are conveniently protected by a housing 190 mounted atop container 11. The housing may include an air intake with dust filter (not shown) and a hot air exhaust fan (not shown). This arrangement does not leave exposed outside the container any flexible fiber optic cables that could potentially be damaged if bent or kinked, for instance.

Figure 18:
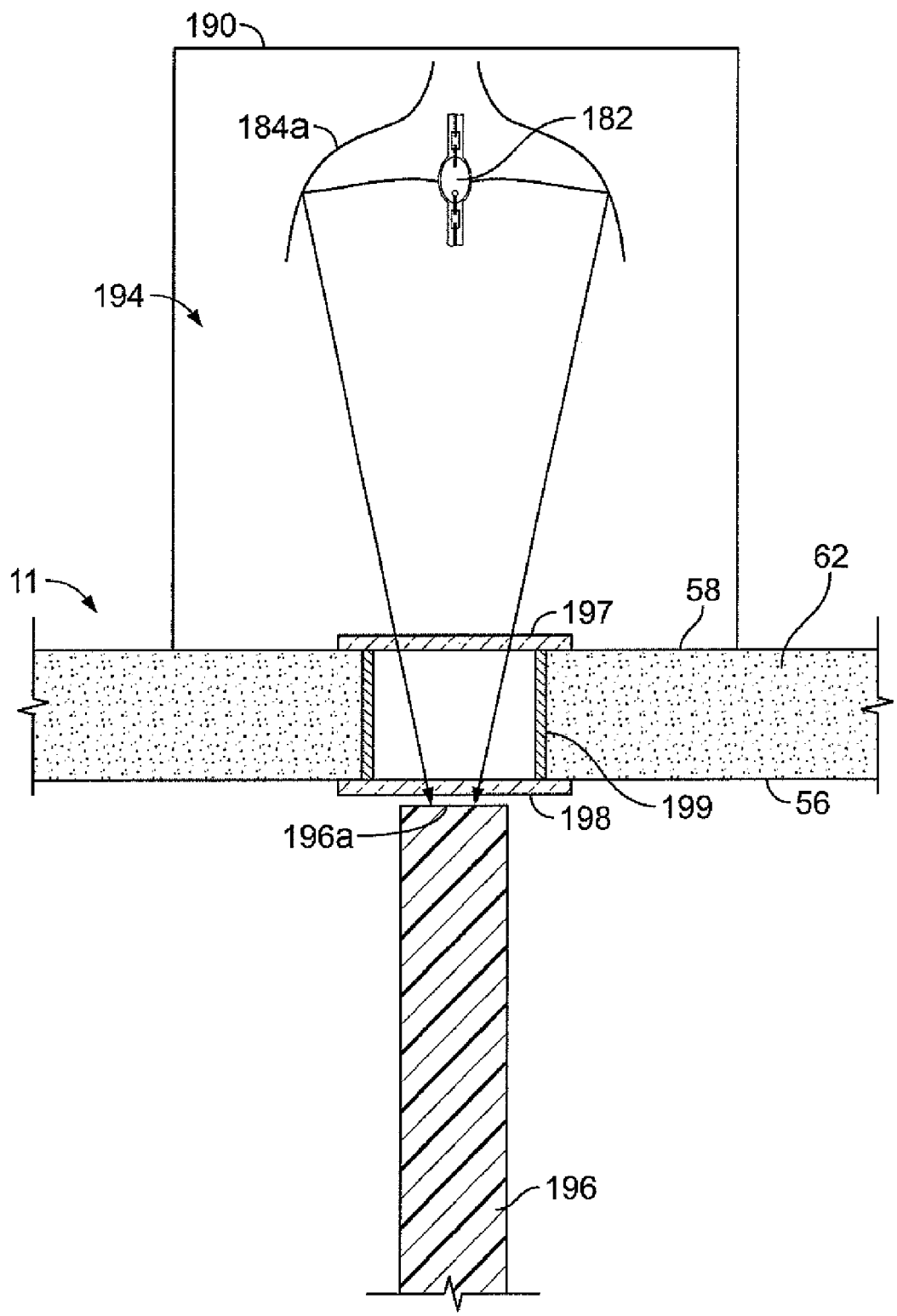
FIG. 18 is a detail view, partially in section, of another light-delivery system that may replace the feed-through and associated light-delivery structures shown in FIG. 1.

FIG. 18 shows another light-delivery system 194 that may replace the feed-throughs 76 and associated light-delivery structures shown in FIG. 1. Light-delivery system 194 comprises an HID lamp 182 and collector 184a. However, collector 184a is configured and positioned to send light directly to a light-receiving surface 196a of a luminaire 196, via a infrared reflecting window 197. Window 197 may be double-paned to further prevent introduction of heat into the interior of container 11. Window 197 may be sealed to external wall 58 of the container by any suitable means, such as adhesive. A similar window 198 may be sealed to internal wall 56 of the container. If desired, a liner 199 may be inserted between windows 198 and 199 to protect insulation 62.

Figure 19:
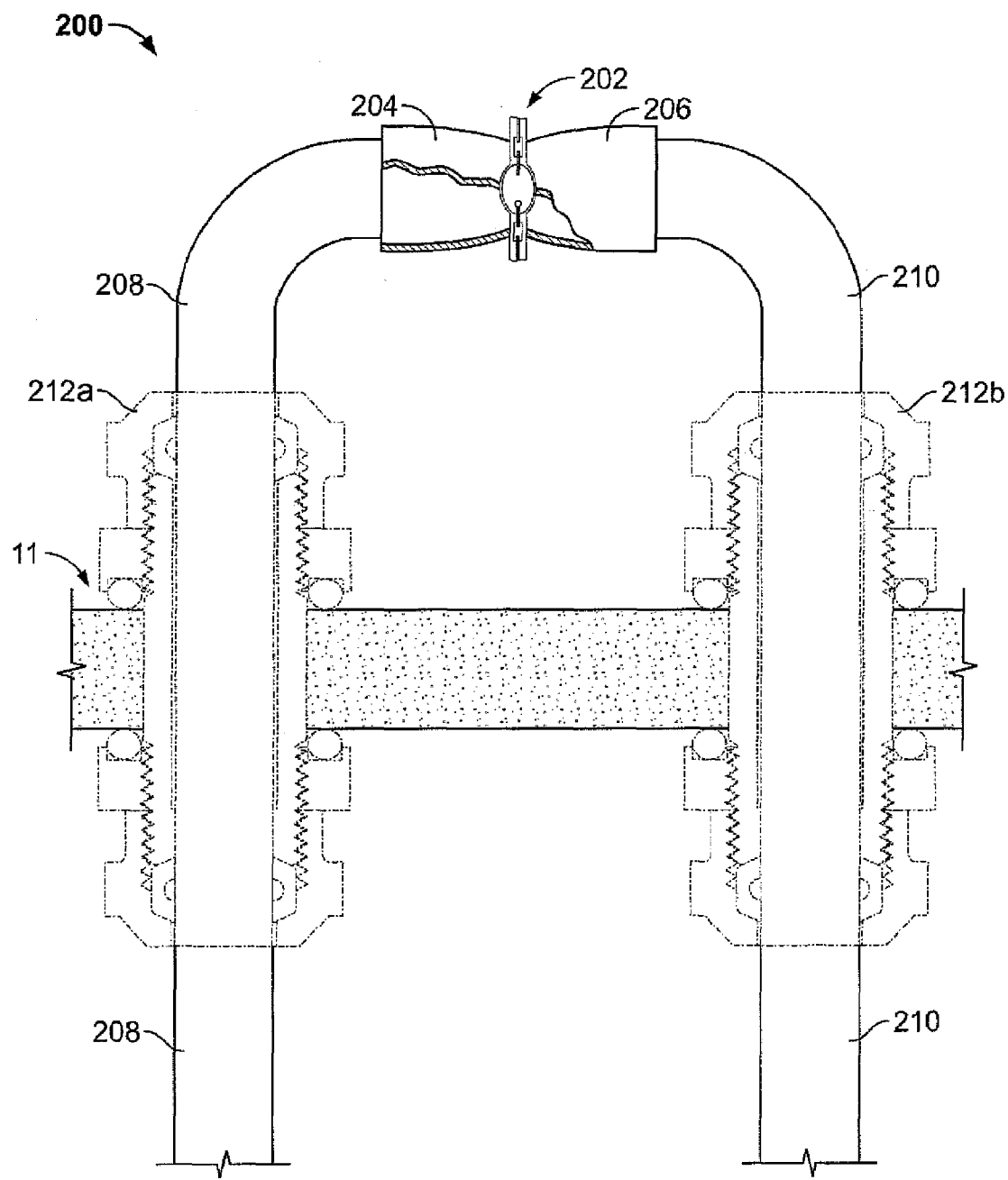
FIG. 19 is a simplified detail view, partially in section, of another light-delivery system that may replace the feed-through and associated light-delivery structures shown in FIG. 1.

FIG. 19 shows another light-delivery system 200 that may replace the feed-throughs 76 and associated light-delivery structures shown in FIG. 1. In system 200, an HID lamp 202 (e.g., metal halide) provides light that is collected by non-imaging collectors 204 and 206. Non-imaging collectors 204 and 206 reduce the angular distribution of light they collect from HID lamp 202. Thermal-isolating rods 208 and 210, typically made of glass or quartz, receive light from collectors 204 and 206, respectively. Rods 208 and 210 may be curved as shown to reorient light received by the rods more than 70 degrees, and preferably about 90 degrees as shown. Rods 208 and 210 may be fed downwardly though the upper surface of container 11 in the same manner as fiber optic structure 78 of FIG. 9 extends downwardly through container 11. Feed-throughs 212a and 212b may be the same as feed-through 76 of FIG. 9. Conveniently, rods 208 and 210 can supply light to adjacent luminaires which respectively direct light to contents of the container visible through respective view ports (e.g., 19a, 20a, FIG. 1) in laterally adjacent doors of the container.

Figure 20:
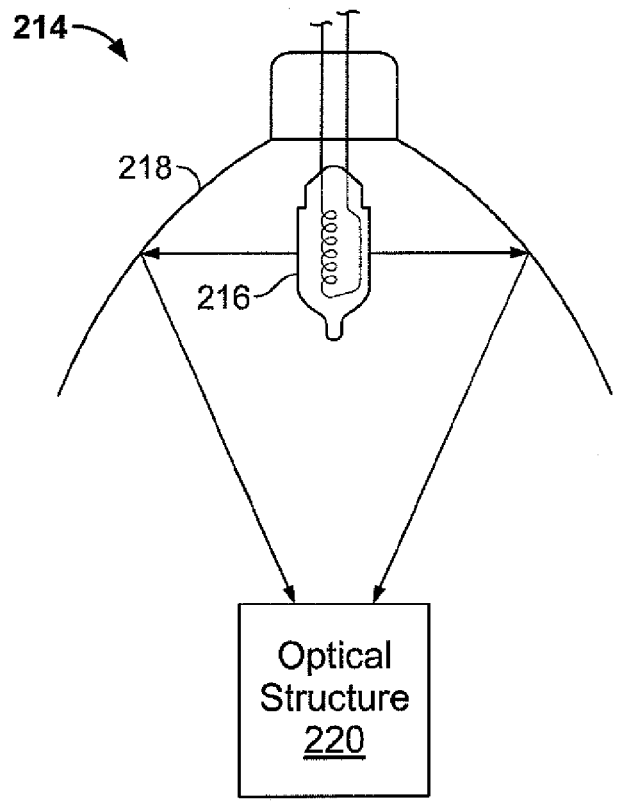
FIG. 20 is a simplified detail view, partially in section and partially in block diagram form, of another light-delivery system that may replace the feed-through and associated light-delivery structures shown in FIG. 1.

FIG. 20 shows another light-delivery system 214 that may replace the feed-throughs 76 and associated light-delivery structures shown in FIG. 1. System 214 includes a halogen lamp 216 and a hollow, dichroic-coated non-imaging collector 218. Non-imaging collectors do not require imaging, but can include imaging, as further described in William J. Cassarly, "Non-imaging Optics: Concentration and Illumination" in the OSA Handbook of Optics, Volume 3, Chapter 2. Collector 218 couples light onto optical structure 220. Optical structure 220 may comprise fiber optic structure 78 of FIG. 9, or window 198 of FIG. 18, by way of example.

Figure 21:
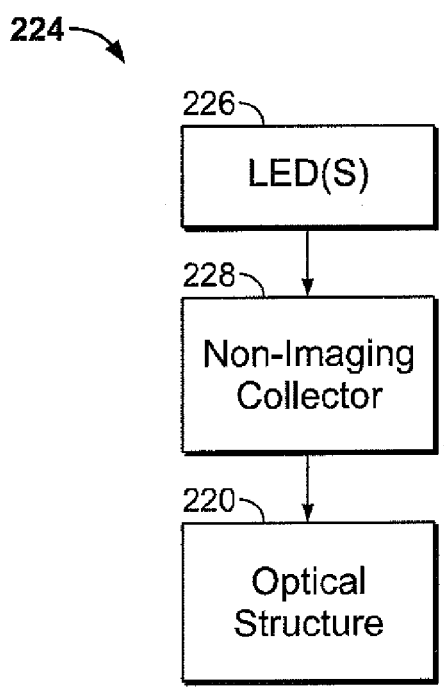
FIG. 21 is a simplified detail view in block diagram form of another light-delivery system that may replace the feed-through and associated light-delivery structures shown in FIG. 1.

FIG. 21 shows another light-delivery system 224 that may replace the feed-throughs 76 and associated light-delivery structures shown in FIG. 1. System 224 includes one or more light-emitting diodes (LEDs) 226, whose light is collected by a non-imaging collector 228, which reduces the angular distribution of light collected from the one or more LEDs 226. Collector 228 provides light to optical structure 220, as described in connection with FIG. 20 above.

Figure 22:
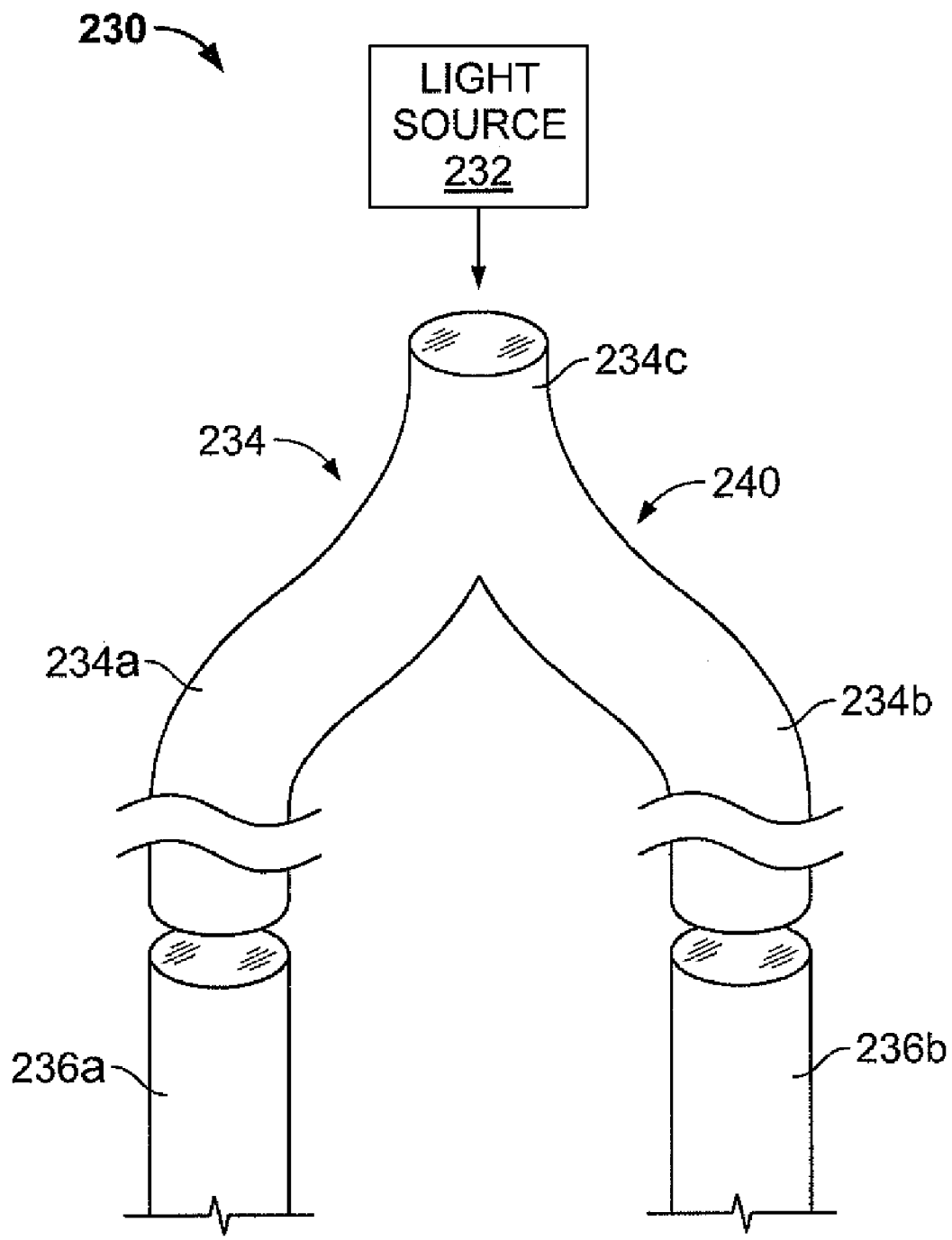
FIG. 22 is a simplified detail view of another light-delivery system that may replace the feed-through and associated light-delivery structures shown in FIG. 1.

FIG. 22 shows another light-delivery system 230 that may replace the feed-throughs 76 and associated light-delivery structures shown in FIG. 1. System 230 includes a light source 232, such as an HID lamp and light collector, a fiber optic optical splitter 234 for apportioning light into to output arms 234a and 234b from an input arm 234c. Splitter 234 could be formed of glass or quartz if light source 232 emitted too much heat, or could be formed of the other materials mentioned above for forming fiber optic structures such as the luminaires. Optical splitter 234 provides light to luminaires 236a and 236b, which may be located completely within the container, or may extend upwardly through the top of the container, as does fiber optic structure 78 of FIG. 9.

Figure 23:
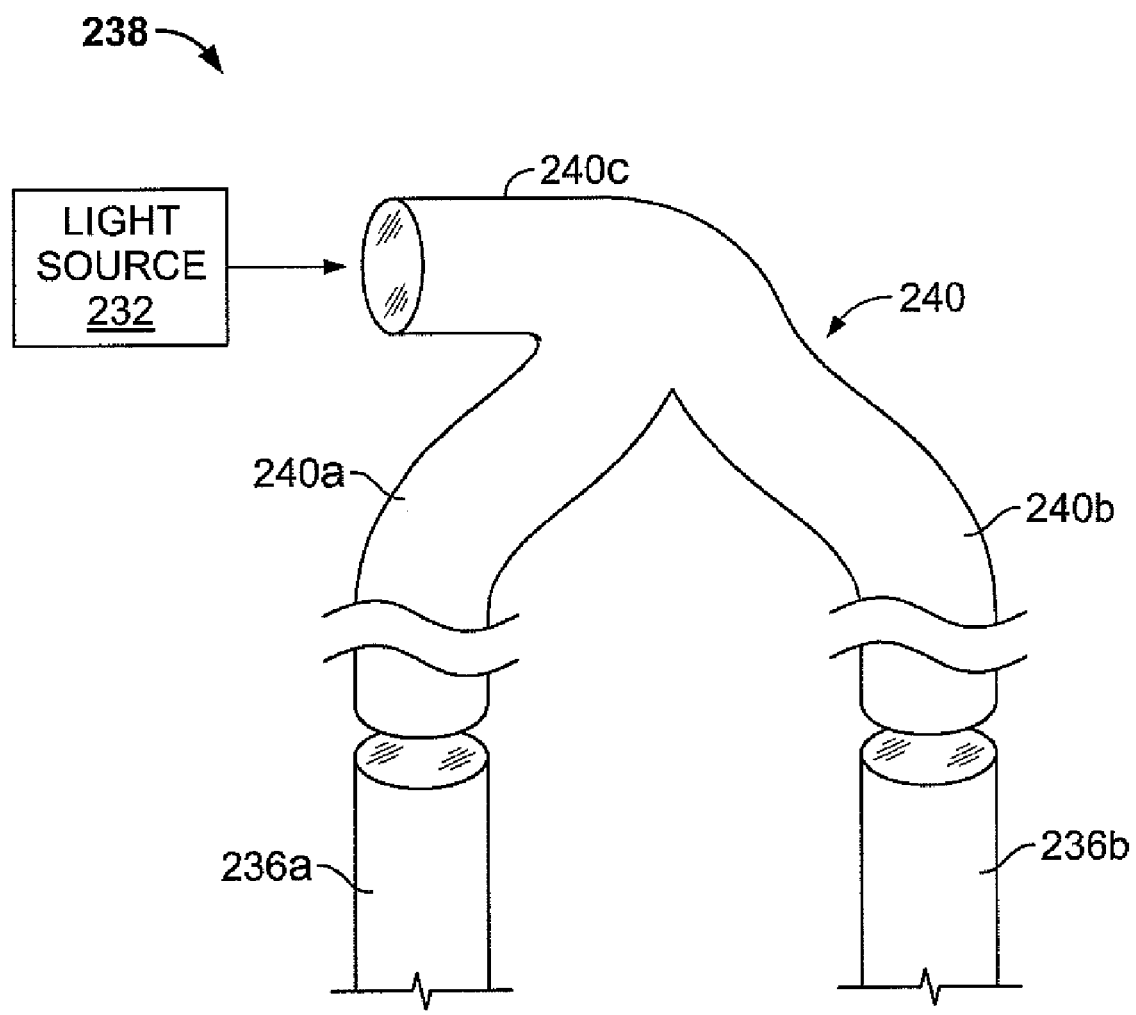
FIG. 23 is similar to FIG. 22, showing a variation of that figure.

FIG. 23 shows another light-delivery system 238 similar to that shown in FIG. 22, but showing a variation of system 230 of that figure. In particular, in system 238, the input arm 240c of fiber optic optical splitter 240 is oriented more than 70 degrees (preferably about 90 degrees) from the main optical axis of luminaires 236a and 236b. This arrangement accommodates a different orientation of light source 232.

Figure 24:
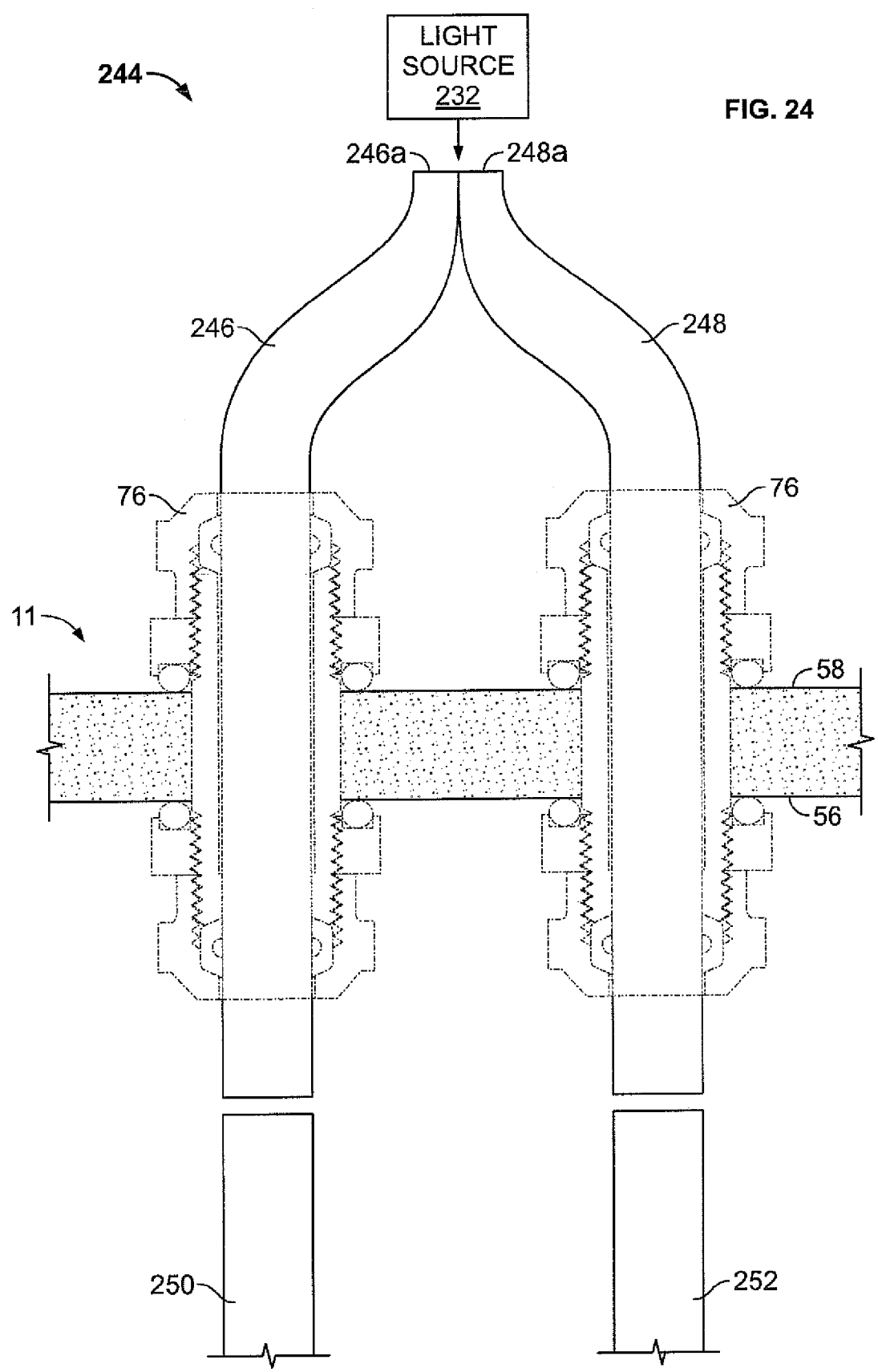
FIG. 24 is a simplified detail view, partially in cross section and partially in block diagram form, of another light-delivery system that may replace the feed-through and associated light-delivery structures shown in FIG. 1.

FIG. 24 shows another light-delivery system 244 that may replace the feed-throughs 76 and associated light-delivery structures shown in FIG. 1. System 244 includes a pair of fiber optic structures 246 and 248 that collectively present their input faces 246a and 246b to a light source 232. Each of input faces 246a and 248a preferably have a half-round shape, so as to present a round shape to light source 232. Each of structures 246 and 248 may have S-shapes as shown, before being fed through the top of container 11 with feed-throughs 76 as described above in connection with FIG. 9. Structures 246 and 248 provide light to luminaires 250 and 252.

Figure 25:
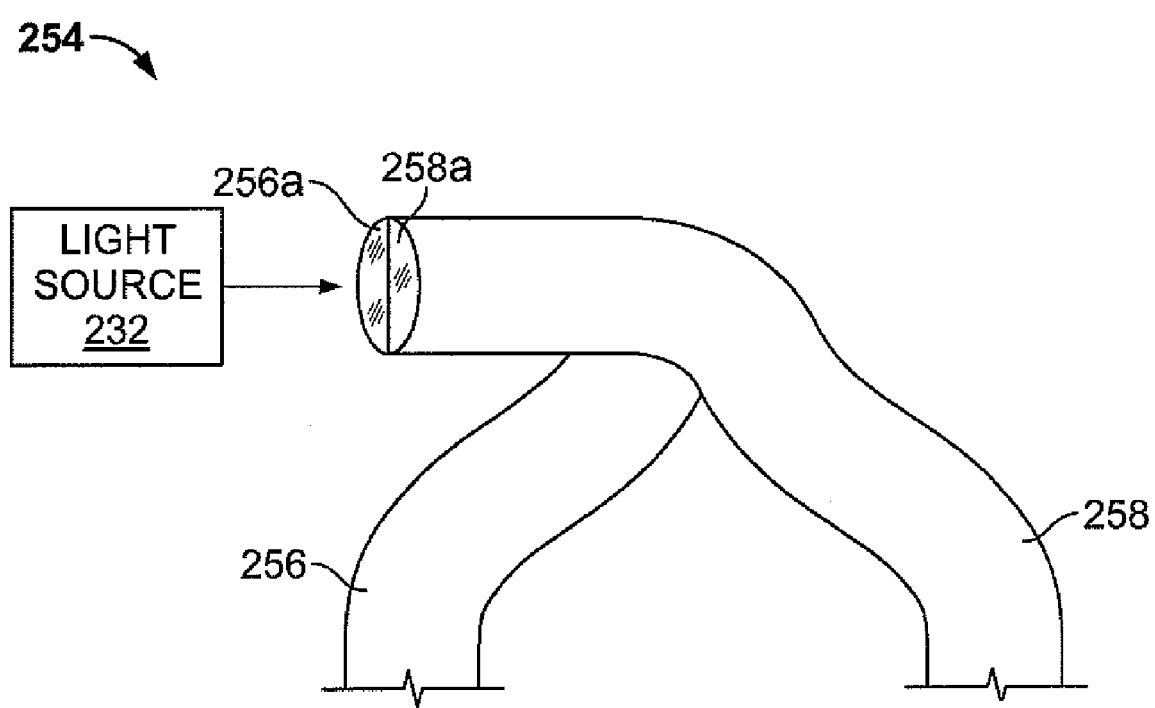
FIG. 25 is similar to FIG. 24, showing a variation of that figure.

FIG. 25 shows another light-delivery system 254 similar to that shown in FIG. 24, but showing a variation of system 244 of that figure. In system 254, light source 232 delivers light along a main optic axis that is angled more than 70 degrees (preferably about 90 degrees) from a main optical axis of a luminaire, which would be vertical for the display case of FIG. 1. A pair of fiber optic structures 256 and 258 present their input faces 256a and 258a to light source 232. The lower portions of structures 256 and 258 have been omitted, but such lower portions may conform to the lower portions of structures 246 and 248 of FIG. 24.

While the invention has been described with respect to specific embodiments by way of illustration, many modifications and changes will occur to those skilled in the art. For instance, it will be routine in the art to incorporate infra-red or ultra-violet filters in the described fiber optic light-delivery systems where useful. Additionally, directions used herein, such as "top" or "downwardly," indicate directions that are exemplary, and are not to be construed as limiting. It is, therefore, to be understood that the appended claims are intended to cover all such modifications and changes as fall within the true scope and spirit of the invention.

What is claimed is:

1. A lighted display case with remote light source, comprising:
   a) a closed container having a front, a back and an interior; the container having first and second view ports in first and second adjacent doors at the front of the container, respectively, for displaying contents of the container;
   b) a target plane being within the container and parallel to the first and second view ports when the first and the second doors are closed; first and second target areas lying on the target plane in the interior of the container; said first and second target areas being at least partially visible through said first and second view ports, respectively, when viewing the front of the container in a direction normal to the target plane when said first and second doors are closed;
   c) one or two linear-shaped, upright fiber optic luminaires, each having an elongated, upright side-light emitting portion; the side-light emitting portion being mounted inside the container and having the positioning of being proximate to the first and second doors of the container and at least partially situated laterally between the first and second view ports from the perspective of a person viewing the front of the container in a direction normal to the target plane; said one or two linear-shaped, upright fiber optic luminaires being the only linear-shaped upright fiber optic luminaires, each with an elongated, upright side-light emitting portion and each having the foregoing positioning;
   d) the side-light emitting portion of each of the one or two fiber optic luminaires comprising a light-extraction region arranged to extract at least one beam of light from the side of the luminaires and preferentially direct said light in at least one radial direction towards front of at least one of the first or second target areas of said contents;
   e) a light-delivery system for providing light to the fiber optic luminaires; the light-delivery system having a light source mounted remotely from the interior of the container;
   f) the first and second target areas appearing separate from each other when viewed from the front of the container in a direction normal to the target plane; the first target area lying on one side of the luminaires and the second target area lying on the other side of the luminaires;
   g) the one luminaire being arranged to illuminate front of the first and second target areas of said contents of the display case, each target area being illuminated by associated light-extraction regions on the luminaire respectively;
   h) the light-extraction regions being spaced from each other around a perimeter of said side-light emitting portion taken orthogonally to a main optical axis of said side-light emitting portion;
   i) the light-extraction regions being spatially divided in segments along the length with gaps between the segments; the longitudinal dimension of the gaps being greater than the radial width of their respective light-extraction region;
   j) the majority of said segments being divided with gaps of at least 20% of the longitudinal dimension of a neighboring segment along length of the light-extraction regions; and
   k) the majority of said segments having a gap portion of an adjacent light-extraction region aligned with at least 20% longitudinal dimension of the respective segment of the adjacent light-extraction region along the length of the light-extraction regions.

2. The display case of claim 1, wherein:
   a) the interior of the container is refrigerated to a temperature below 7 C; and
   b) the container is thermally insulated from an ambient of the container.

3. A lighted display case with remote light source, comprising:
   a) a closed container having a front, a back and an interior; the container having first and second view ports in first and second adjacent doors at the front of the container, respectively, for displaying contents of the container;
   b) a target plane being within the container and parallel to the first and second view ports when the first and the second doors are closed; first and second target areas lying on the target plane in the interior of the container; said first and second target areas being at least partially visible through said first and second view ports, respectively, when viewing the front of the container in a direction normal to the target plane when said first and second doors are closed;
   c) one or two linear-shaped, upright fiber optic luminaires, each having an elongated, upright side-light emitting portion; the side-light emitting portion being mounted inside the container and having the positioning of being proximate to the first and second doors of the container and at least partially situated laterally between the first and second view ports from the perspective of a person viewing the front of the container in a direction normal to the target plane; said one or two linear-shaped, upright fiber optic luminaires being the only linear-shaped upright fiber optic luminaires, each with an elongated, upright side-light emitting portion and each having the foregoing positioning;
   d) the side-light emitting portion of each of the one or two fiber optic luminaires comprising a light-extraction region arranged to extract at least one beam of light from the side of the luminaires and preferentially direct said light beam in at least one radial direction towards front of at least one portion of the target area of said contents;
   e) a light-delivery system for providing light to the fiber optic luminaires; the light-delivery system having a light source mounted remotely from the interior of the container;
   f) the luminaires being arranged to illuminate front of two laterally adjacent, separate target areas of said contents of the display case, each target area being illuminated by associated light-extraction regions on the luminaires respectively;
   g) the light-extraction regions being spaced from each other around a perimeter of said side-light emitting portion taken orthogonally to a main optical axis of said side-light emitting portion;
   h) the light-extraction regions being spatially divided in segments along the length with gaps between the segments; the longitudinal dimension of the gaps being greater than the radial width of their respective light-extraction region;

i) the majority of said segments being divided with gaps of at least 20% of the longitudinal dimension of a neighboring segment along length of the light-extraction regions; and
j) the majority of said segments having a gap portion of an adjacent light-extraction region aligned with at least 20% longitudinal dimension of the respective segment of the adjacent light-extraction region along the length of the light-extraction regions.

4. The display case of claim 3, wherein:
a) the interior of the container is refrigerated to a temperature below 7 C; and
b) the container is thermally insulated from an ambient of the container.

* * * * *